(12) United States Patent
Baker et al.

(10) Patent No.: US 9,640,158 B1
(45) Date of Patent: May 2, 2017

(54) DYNAMIC MUSIC AUTHORING

(71) Applicant: APPLE INC., Cupertino, CA (US)

(72) Inventors: Robert Baker, Cupertino, CA (US); Gerhard Lengeling, Cupertino, CA (US); Alec Little, Cupertino, CA (US); Patrick Beard, Cupertino, CA (US); Ole Lagemann, Hamburg (DE); Danny Patterson, Cupertino, CA (US); Tobias Hermann, Hamburg (DE)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/001,106

(22) Filed: Jan. 19, 2016

(51) Int. Cl.
G10H 1/00 (2006.01)
G10H 1/18 (2006.01)
G10H 7/00 (2006.01)
G06F 3/16 (2006.01)

(52) U.S. Cl.
CPC ........... *G10H 1/0008* (2013.01); *G06F 3/165* (2013.01); *G10H 1/18* (2013.01); *G10H 2210/105* (2013.01); *G10H 2210/125* (2013.01); *G10H 2220/106* (2013.01); *G10H 2240/131* (2013.01)

(58) Field of Classification Search
CPC .. G10H 1/0008; G10H 1/18; G10H 2220/106; G10H 2210/105; G10H 2210/125; G10H 2240/131; G06F 3/165
USPC ........................................................ 84/615
See application file for complete search history.

(56) References Cited

U.S. PATENT DOCUMENTS

| | | | |
|---|---|---|---|
| 6,204,840 B1 | 3/2001 | Petelycky et al. | |
| 7,394,010 B2* | 7/2008 | Nishibori | G10H 1/06 84/464 A |
| 7,536,257 B2* | 5/2009 | Nishibori | G10H 1/0016 701/419 |
| 7,709,724 B2* | 5/2010 | Nishibori | G10H 1/0016 84/609 |
| 7,728,212 B2* | 6/2010 | Fujishima | G10H 1/0025 700/94 |
| 7,884,275 B2 | 2/2011 | Tedman et al. | |
| 8,330,033 B2* | 12/2012 | Lengeling | G10H 1/42 84/477 R |
| 8,910,032 B2 | 12/2014 | Graves et al. | |
| 9,076,264 B1* | 7/2015 | Gillespie | G06T 11/206 |
| 2006/0236846 A1* | 10/2006 | Nishibori | G10H 1/34 84/603 |
| 2007/0022865 A1* | 2/2007 | Nishibori | G10H 1/0016 84/609 |
| 2009/0043410 A1* | 2/2009 | Evans | G10H 1/0025 700/94 |

(Continued)

*Primary Examiner* — Jeffrey Donels
(74) *Attorney, Agent, or Firm* — Chia-Hsin Chu; Page Ponsford; DLA Piper LLP US

(57) ABSTRACT

In some implementations, a computing device can be configured to present a graphical user interface that enables the dynamic authoring of music by a user of the computing device. The computing device can present a grid of cells, where each cell represents a music segment. The cells can be configured to playback the music segment once or playback the music segment in a repeating loop. The user can select (e.g., touch) one or more cells in the grid to cause the corresponding music segment to play. While playing selected cells, the user can provide input selecting various musical effects to apply to the playing music. The user can record a dynamically selected sequence of cells and musical effects to create an original musical product.

21 Claims, 27 Drawing Sheets

(56) References Cited

U.S. PATENT DOCUMENTS

| | | | |
|---|---|---|---|
| 2010/0064880 A1* | 3/2010 | Takehisa | G10H 1/24 |
| | | | 84/609 |
| 2010/0322042 A1 | 12/2010 | Serletic et al. | |
| 2012/0014673 A1 | 1/2012 | O'Dwyer | |
| 2013/0239787 A1* | 9/2013 | McMillen | G10H 1/02 |
| | | | 84/643 |
| 2014/0076126 A1* | 3/2014 | Terry | G10H 1/34 |
| | | | 84/609 |
| 2014/0140536 A1* | 5/2014 | Serletic, II | G06F 3/0481 |
| | | | 381/98 |
| 2014/0270181 A1* | 9/2014 | Siciliano | G11B 27/038 |
| | | | 381/17 |
| 2014/0270263 A1* | 9/2014 | Fejzo | G10H 1/125 |
| | | | 381/119 |
| 2015/0268924 A1 | 9/2015 | Torrales, Jr. | |
| 2016/0104471 A1* | 4/2016 | Hyna | G10H 1/386 |
| | | | 84/613 |
| 2016/0314771 A1* | 10/2016 | Gimate-Welsh | G10H 1/0008 |
| 2016/0342200 A1* | 11/2016 | Dziuk | G11B 27/038 |

\* cited by examiner

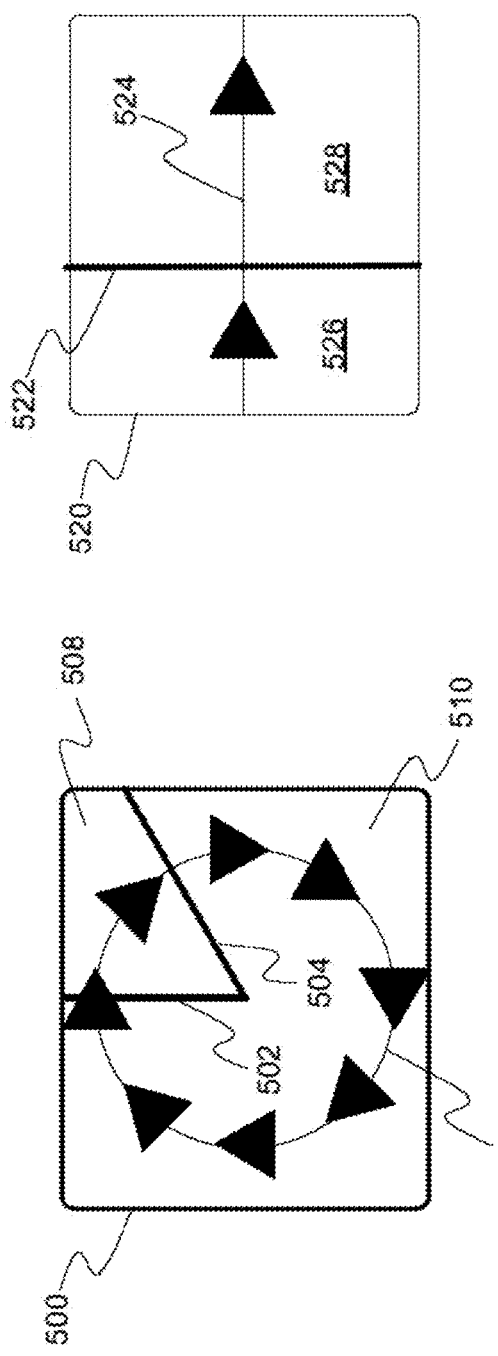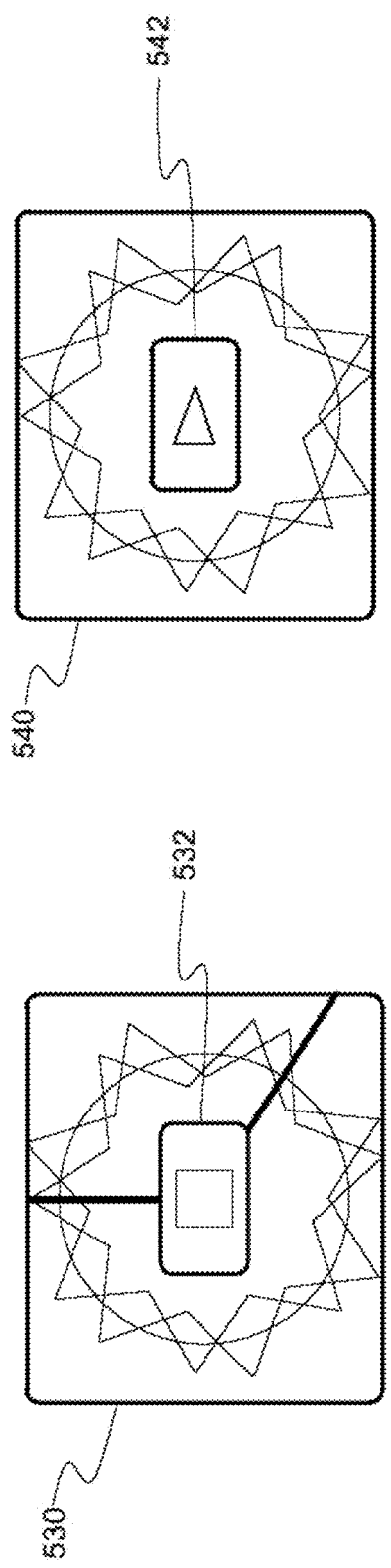
FIG. 5

DYNAMIC MUSIC AUTHORING

TECHNICAL FIELD

The disclosure generally relates to music authoring.

BACKGROUND

Modern computing devices can be configured with software that allows users to create music at home. For example, music authoring software can provide features that allow users to store music tracks, samples, or other prerecorded music segments and combine the music segments to create an original musical product. However, the music authoring software is often difficult to use and often requires the user to have specific expertise or training in how to use the music authoring software to combine the music segments into a coherent musical product.

SUMMARY

In some implementations, a computing device can be configured to present a graphical user interface that enables the dynamic authoring of music by a user of the computing device. The computing device can present a grid of cells, where each cell represents a music segment. The cells can be configured to playback the music segment once or playback the music segment in a repeating loop. The user can select (e.g., touch) one or more cells in the grid to cause the corresponding music segment to play. While playing selected cells, the user can provide input selecting various musical effects to apply to the playing music. The user can record a dynamically selected sequence of cells and musical effects to create an original musical product.

Particular implementations provide at least the following advantages. The systems and graphical user interfaces provide a simplified, intuitive, and fun environment for creating music. The system can automatically adjust the playback of selected cells to correct errors in timing in order to produce a coherent sequence of musical segments. Audio effects can be applied to the cells/musical segments using a fun, intuitive, and visually appealing graphical interface.

Details of one or more implementations are set forth in the accompanying drawings and the description below. Other features, aspects, and potential advantages will be apparent from the description and drawings, and from the claims.

DESCRIPTION OF DRAWINGS

FIG. 5 illustrates example graphical elements for music cells.

Like reference symbols in the various drawings indicate like elements.

DETAILED DESCRIPTION

Example System

Figure 1:
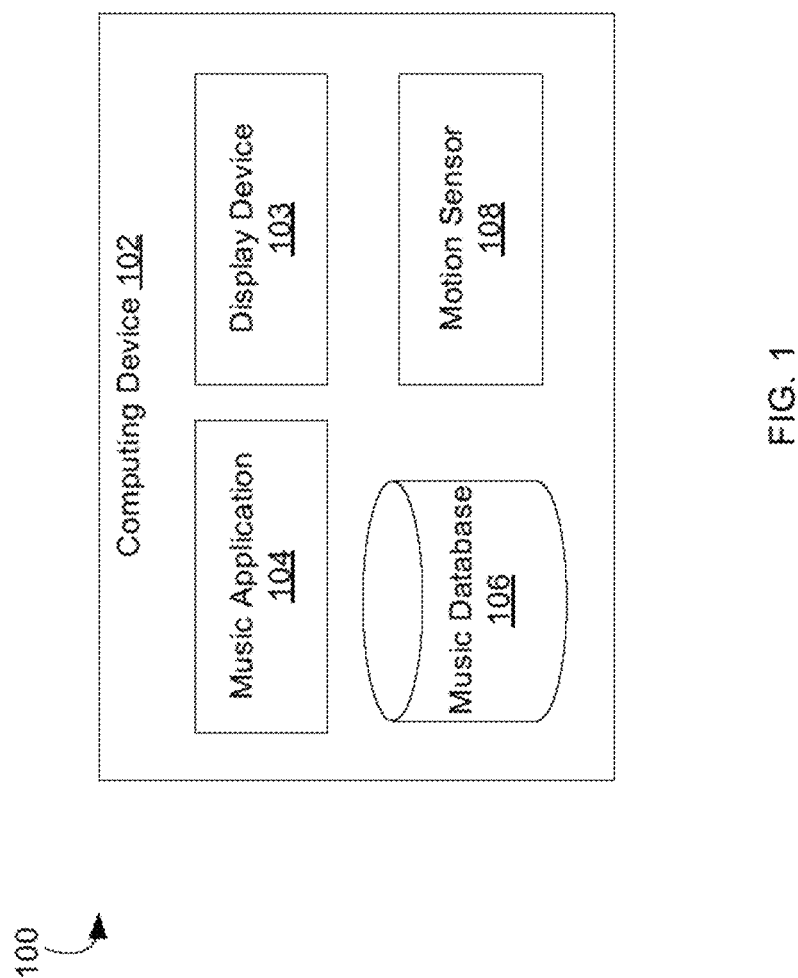
FIG. 1 illustrates an example system configured for the dynamic authoring of music.

FIG. 1 illustrates an example system 100 configured for the dynamic authoring of music. For example, system 100 can provide various Graphical User Interfaces (GUIs) for implementing various features, processes or workflows. These GUIs can be presented on a display of computing device 102. Computing device 102 can, for example, be one of a variety of electronic devices including but not limited to laptop computers, desktop computers, computer terminals, television systems, tablet computers, e-book readers, smart phones, and/or wearable devices such as a smart watch, smart glasses, smart goggles, etc.

In some implementations, computing device 102 can include a touch-sensitive surface. The touch sensitive surface can be, for example, part of display 103 (e.g., a touch sensitive display). Display 103 can be an internal display, as illustrated by FIG. 1, or an external display of computing device 102. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

In some implementations, computing device 102 can include music application 104. For example, music application 104 can be a software application installed on computing device 102 that is configured with features that a user of computing device 102 can use or interact with to create or author music from music segments stored in music database 106 on computing device 102.

In some implementations, music application 104 can present graphical user interfaces (described below) that present a grid of music cells. Each music cell can include a segment of recorded music (e.g., pre-existing music, music generated and/or recorded by the user, etc.). Each music cell can be configured with properties that control how the corresponding music segment is played back when the music cell is selected. A user of computing device 104 can select one or more cells to cause computing device 102 to playback the corresponding music segments according to the cells' properties. The user can select a recording option to record the music segments or music cells as they are played back by computing device 102.

In some implementations, music application 104 can be configured with features that a user of computing device 102 can use or interact with to edit music cells. For example, music application 104 can present a GUI that allows the user to create a new music cell or edit an existing music cell. Music application 104 can present a GUI that allows the user to create a new music segment for a music cell or edit an existing music segment in a music cell.

In some implementations, music application 104 can be configured with features that a user of computing device 102 can use or interact with to apply audio effects to music cells as they are being played back. For example, music application 104 can present a GUI that includes graphical elements that a user can select to apply various audio effects to the music cells being played back by computing device 102. In some implementations, audio effects can be applied to music cells according to data generated by motion sensor 108. For example, the user can tilt, rotate, shake, or otherwise move computing device 102. Motion sensor 108 can detect the movement, generate motion sensor data describing the movement, and provide the motion sensor data to music application 104. Music application 104 can apply audio effects to the playback of music cells based on the sensor data, as described further below. The user can select a recording option to record the music segments and audio effects as the music cells are played back by computing device 102.

Music Authoring Templates

Figure 2:
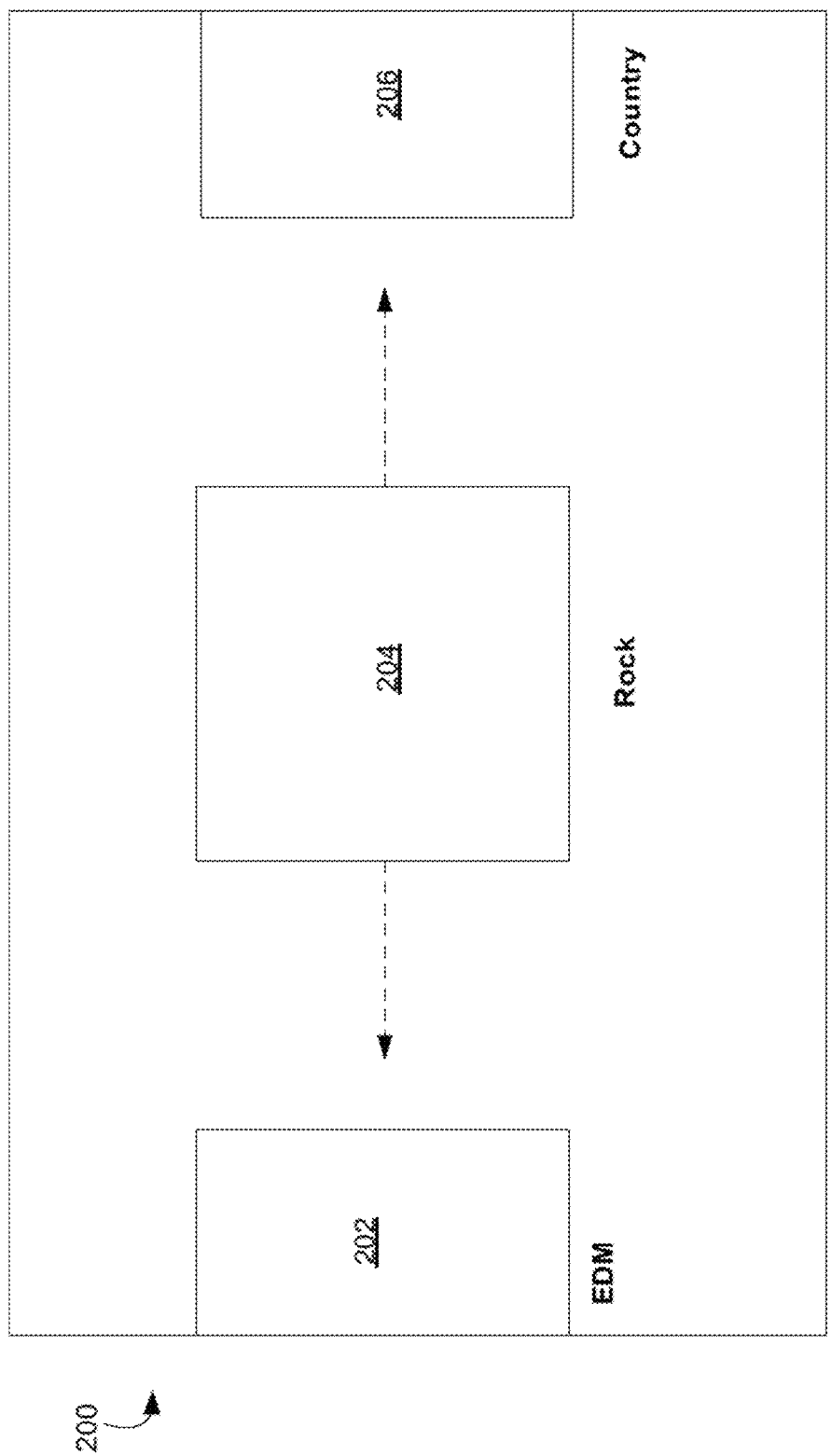
FIG. 2 illustrates an example graphical user interface presenting music authoring templates.

FIG. 2 illustrates an example graphical user interface 200 presenting music authoring templates. For example, GUI 200 can be a graphical user interface of music application 104 presented on display 103 of computing device 102. GUI 200 can present graphical representations 202, 204, and/or 206 of music authoring templates corresponding to various musical genres. For example, GUI 200 can present representation 202 corresponding to the electronic dance music genre. GUI 200 can present representation 204 corresponding to the rock music genre. GUI 200 can present representation 206 corresponding to the country music genre.

In some implementations, template representations 202, 204, and/or 206 can be presented using a carousel GUI metaphor that allows the user to provide input to navigate through the music authoring templates by rotating the carousel. For example, GUI 200 currently displays rock template 204 front and center on GUI 200. To view other authoring templates, the user can provide input (e.g., left swipe, right swipe, left arrow key, right arrow key, etc.) to GUI 200 to cause GUI 200 to rotate EDM template 202 or country template 206 into the front and center position. Once the user has located a desired template, the user can provide input (e.g., a tap, a mouse click, return key, etc.) to select the desired template. For example, the user can tap template representation 204 to select the rock authoring template.

Music Authoring Grids

Figure 3:
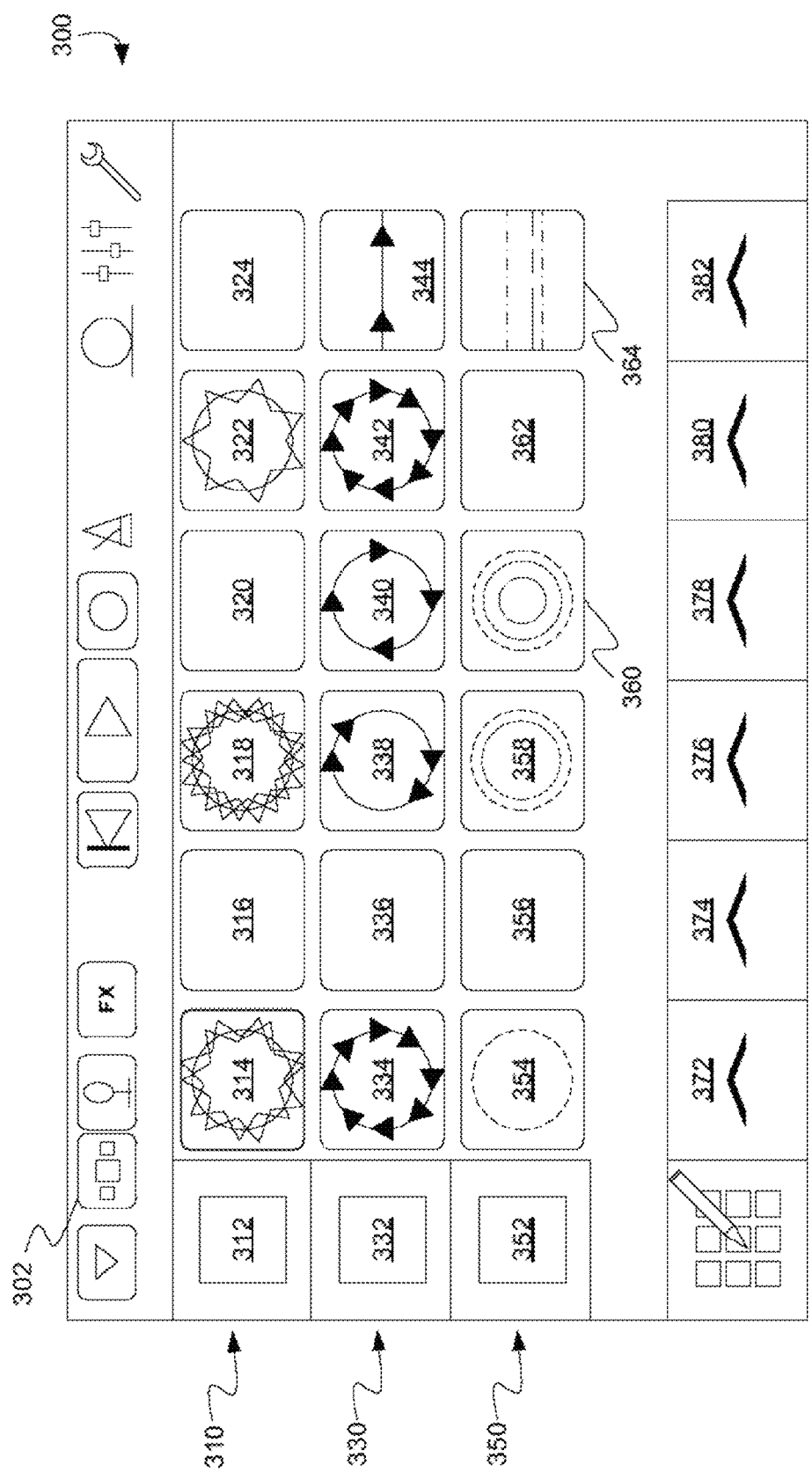
FIG. 3 illustrates an example graphical user interface presenting a grid of music cells for composing music.

FIG. 3 illustrates an example graphical user interface 300 presenting a grid of music cells for composing music. For example, GUI 300 can be presented on display 103 of computing device 102 in response to receiving a selection of a music authoring template presented on GUI 200. For example, if the user selects rock template 204 from GUI 200, GUI 300 can present a grid of music cells arranged and/or configured to recreate sounds of the rock music genre. A user can select graphical element 302 on GUI 300 to return to template selection GUI 200 of FIG. 2. The user can interact with the music cells within the grid of music cells to generate music as if the grid itself was a virtual musical instrument, as described further below. The grid of music cells can be scrollable and/or zoomable. For example, the user can provide input to scroll through rows and/or columns of music cells. The user can provide input to zoom in on the grid so that fewer rows and/or columns are displayed. The user can provide input to zoom out so that more rows and/or columns are displayed.

In some implementations, GUI 300 can include a grid of music cells. For example, GUI 300 can include a grid (e.g., two dimensional array) of music cells 314-324, 334-344, and/or 354-364. Each row 310, 330, and/or 350 in the grid can correspond to a musical instrument or device. For example, row 310 can correspond to vocals. Row 330 can correspond to a percussion instrument (e.g., a drum, symbol, etc.). Row 350 can correspond to a MIDI instrument (e.g., a keyboard). Graphical elements 312, 332 and/or 352 can present a representation (e.g., icon, image, graphic, etc.) of the instrument assigned to the corresponding row. For example, graphical element 312 can present an image of a microphone. Graphical element 332 can present an image of a drum or drum set. Graphical element 352 can present an image of a keyboard or computer. Each row can be color coded (e.g., be presented with a specific background color) according to the type of instrument corresponding to the row. For example, audio instruments can be represented by a blue background, while MIDI instruments can be represented by a yellow or green background.

In some implementations, each cell in a row can represent a musical idea generated using the corresponding row's instrument. For example, each cell can be a container that includes one or more recorded music segments (e.g., sample, snippet, etc.) generated by that row's instrument and options (e.g., parameters, attributes, etc.) that define how the music segment should be played. Cells 314-324 can be music cells that include vocal recordings. Cells 334-344 can be cells that include percussion recordings. Cells 354-364 can be cells that include MIDI instrument (e.g., keyboard) recordings. Music cells that are configured to playback (e.g., cells 314, 344, 354, etc.) a music segment can present a graphic (e.g., sound wave, audio signal, etc.) representing the music segment of the corresponding cell. Empty cells (e.g., cells 316, 336, 356, etc.) that are not configured with a corresponding music segment are represented by cells without a graphical representation of a corresponding music segment.

Music Cell Graphics

In some implementations, the graphic representing the music segment of a cell can be generated based on the music segment and/or configuration of the corresponding cell. For example, an audio music segment can be graphically represented by a corresponding waveform distributed across a timeline, as illustrated by cell 344. A MIDI music segment can be graphically represented by dots or dashes representing corresponding notes or tones of the MIDI music segment distributed across a timeline according to when the notes are played, as illustrated by cell 364. For example, each line presented on MIDI music cell 364 can represent a different note where notes are distributed along a vertical axis and time is distributed along a horizontal axis.

When MIDI generated music is presented as a loop (e.g., music cell 360), the distance from the center of the music cell to a line (e.g., dash, dot, etc.) presented on the music cell can correspond to a note or pitch played by the MIDI instrument. Thus, lines at the same radius distance from the center of a cell represent the same note, lines at different radius distances from the center of a cell represent different notes. For percussion instruments, lines at the same radius distance from the center of a cell represent the same piece (e.g., drum, symbol, etc.) of the drum kit, lines at different radius distances from the center of a cell represent different pieces of the drum kit.

When a cell is configured for single playback, then the representation of the music segment can be presented in a linear representation, as illustrated by cell 344 and/or cell 364. If a cell is configured for looped playback, then the representation of the music segment can be presented in a circular representation, as illustrated by cells 314, 334 and/or 358. For example, the linear representation of a music segment, as illustrated by cell 244 and cell 364, can be transformed into a circular representation such that the beginning and end of the music segment of the cell are touching thereby representing a continuously looped musical segment. When the user selects a cell for playback, the music segment of the selected cell can be played back according to the single or looped playback configuration of the cell.

In some implementations, GUI 300 can include graphical elements 372-382 for selecting columns for playback. For example, while a single cell in a single row can be played back at a time, multiple cells from different rows can be played back simultaneously. A template or a user can arrange cells from different rows (e.g., different instruments) into a column so that the cells in the column can be played together. The music cells can be arranged in the same column to create a related group of musical ideas, for example. The user can select graphical element 376 to cause cells 318, 338 and 358 in the same column as graphical element 376 to be played simultaneously.

Figure 4:
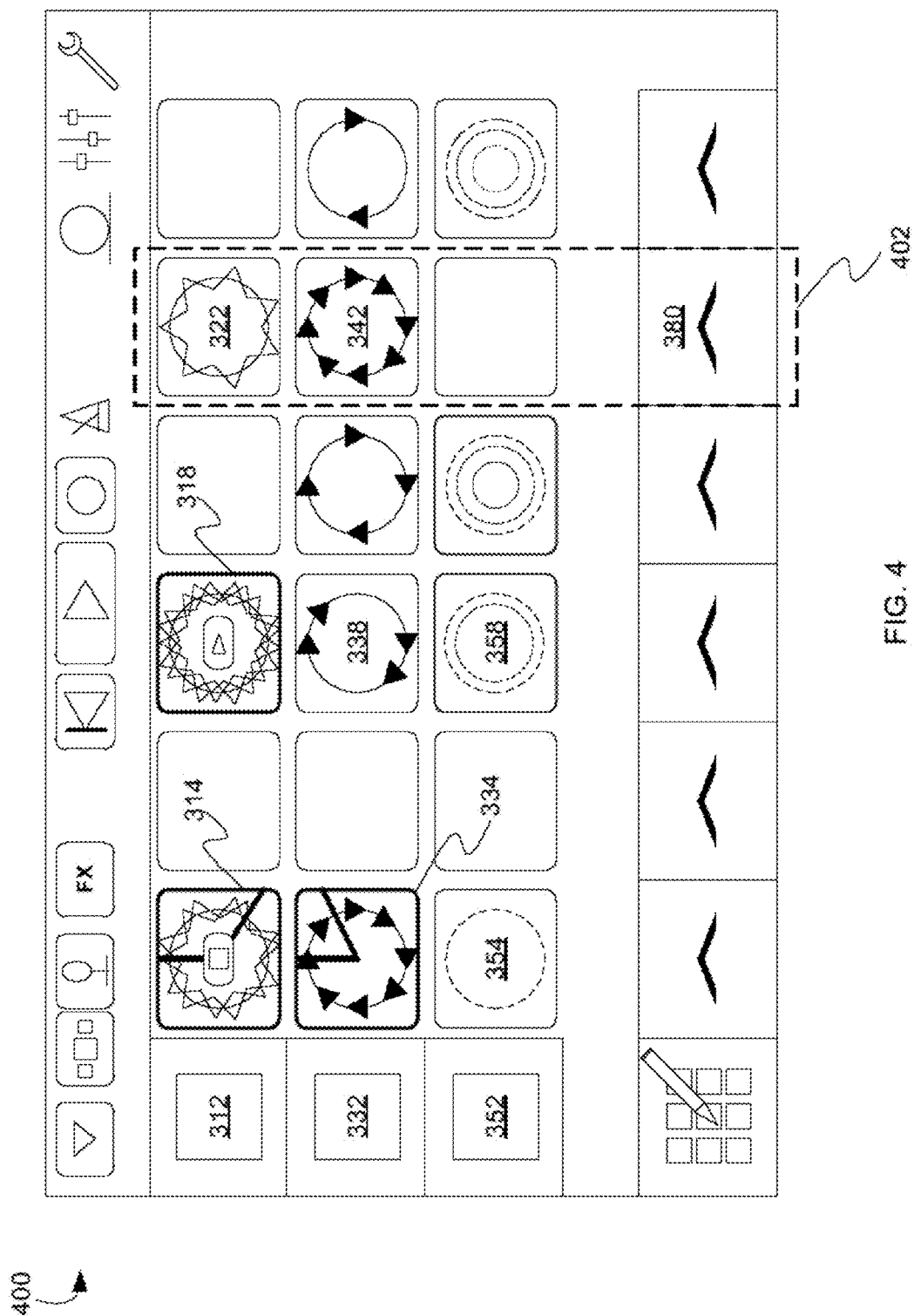
FIG. 4 illustrates an example graphical user interface for playing back music cells.

FIG. 4 illustrates an example graphical user interface 400 for playing back music cells. GUI 400 can correspond to GUI 300 of FIG. 3, for example. In some implementations, to playback a cell, a user can select one or more music cells from GUI 400. If computing device 102 has a touch sensitive display, for example, then the user can select a music cell for playback by touching the music cell.

Playing Single Cells

In some implementations, the user can select a single music cell for playback. For example, a user can select (e.g., touch, tap, etc.) music cell 334 to cause playback of the music segment of music cell 334 according to the playback options of music cell 334. For example, the playback options or settings of a music cell can include a gain setting specifying a gain level for the music cell. The playback options for a music cell can include a looping setting specifying whether the music segment of the cell should be looped or played back a single time. The playback options for a music cell can include a length setting specifying for how many beats or bars the cell should be played. For example, each music cell in the music cell grid of GUI 300 can have a different length. Thus, when a combination of music cells is played, the resulting aggregate musical piece can have an overall different timing than the individual music cells from which the musical piece is generated.

The playback options for a music cell can include a semitone transposition setting specifying over how many tones the music segment of the cell should be transposed. The playback options for a music cell can include a speed setting specifying a speed multiplier for increasing or decreasing the playback speed of the cell's music segment. The playback options for a music cell can include a reverse setting specifying whether the cell's music segment should be played in the original forward time sequence or in reverse time sequence.

In some implementations, the user interactions with a music cell can be adjusted or defined by the user. For example, the user can select a music cell option that allows the user to play/stop music cells when selected. The play/stop option acts as a toggle such that when a user touches a music cell that is not currently playing, the music cell will start playing and when the user touches a playing music cell, the music cell will stop playing. The user can select a music cell option that plays back a music cell while input is continuously applied to the music cell. For example, the music cell will be played while the user continues to touch the music cell and playback will stop when the user is no longer touching the music cell. The user can select a music cell option that retriggers the playback of a music cell. For example, the retrigger option causes the initial input (e.g., touch input) to a music cell to initiate playback of the music cell while subsequent input causes restarting the music cell playback.

Playing Multiple Cells

In some implementations, the user can select multiple music cells for playback. For example, the user can select multiple music cells by providing multiple touch inputs to GUI 400. For example, the user can simultaneously select (e.g., touch, tap, etc.) individual music cells to cause each selected cell to play. Alternatively, the user can touch and hold music cell 334 while selecting other music cells. For example, while holding (e.g., continuing to touch) cell 334, the user can touch music cell 314 to select both music cell 334 and music cell 314 for playback. Computing device 102 (e.g., music application 104) can begin playing back the music cells upon detecting the initial input or upon detecting the release of the holding input (e.g., when the user is no longer touching any music cell).

In some implementations, the user can select multiple music cells using a swipe input. For example, the user can select multiple cells by touching a first cell and dragging the user's finger across one or more other cells while continuing to provide the touch input. For example, computing device 102 can detect the initial touch input with respect to cell 314 and detect that the location of the touch input on display device 103 is moved across cell 334 and cell 354. Upon release of the touch input, computing device 102 can initiate playback of music cells 314, 334 and 354.

In some implementations, the user can select multiple music cells using a column selector graphical element. For example, upon receiving input selecting column selector graphical element 380, computing device 102 can initiate playback of music cells 322 and 342 in the same column 402 as graphical element 380.

In some implementations, music application 104 can stop playing a music cell when another cell in the same row is selected. For example, if music cell 314 is playing, the user can select music cell 318 or empty cell 316 to cause music application to stop playing music cell 314.

Time Snap

In some implementations, music application 104 can delay playback of selected music cells to synchronize playback of different music cells. For example, music application 104 can be configured with a time snap boundary. The time snap boundary can be a specified number of beats, bars, or other musical time increment or unit. For example, when the time snap boundary is set to one bar, operations with respect to the playback of musical cells will be executed according to the time snap boundary.

For example, the user can select music cell 314 for playback. When music cell 314 is selected, music application 104 can start a musical timer that tracks the amount of time that has passed (e.g., in beats, bars, minutes, etc.) since the user selected music cell 314. As music application 104 is playing music cell 314, the user can select music cell 334. When music cell 334 is selected, music application 104 can determine whether the selection of music cell 334 occurred at time corresponding to a multiple of the time snap boundary (e.g., 1 bar). For example, music application 104 can determine whether the current time of the musical timer corresponds to a multiple of the time snap boundary (e.g., 2 bar, 5 bar, 11 bar, etc.). When the selection of music cell 334 occurs at a time snap boundary (e.g., 6 bar), music application 104 can begin playing music cell 334 immediately. When the selection of music cell 334 does not occur at a time snap boundary (e.g., 3.5 bar), music application 104 can begin playing music cell 334 when the next time snap boundary (e.g., 4 bar) is reached. Since music cell 314 and music cell 334 are in different rows (e.g., row 310 and row 330), music cell 314 will continue to play when music cell 334 begins playing. If music cell 314 and music cell 334 were in the same row, music application 104 would stop playing music cell 314 when music cell 334 began playing at the time snap boundary.

Smart Pickup

In some implementations, music application 104 can begin playback of a music cell from a playback position offset from the beginning of the music cell. As described above, music cells are started, stopped, played back, etc., according to a time snap boundary. If the time snap value is set to 2 bar, then time snap boundaries occur at multiples of 2 bar (e.g., 2 bar, 4 bar, 16 bar, etc.). In some cases, the user may wish to initiate playback of a music cell at the 4 bar time snap boundary but the user's input selecting the music cell may occur slightly after the boundary. Music application 104 can adjust the playback of the selected music cell so the music cell can be played as if started at the 4 bar time snap boundary.

In some implementations, music application 104 can provide a grace period for music cell selection that automatically compensates for latency in the selection of music cells. For example, the grace period can be some threshold portion (e.g., $\frac{1}{8}^{th}$, $\frac{1}{16}^{th}$, etc.) of the time snap value. When the user selects a music cell within grace period threshold of a time snap boundary, music application 104 can start the playback of the music cell from a position offset based on the lateness of the user's input. For example, if the time snap value is 2 bar and the grace period threshold is $\frac{1}{8}^{th}$ of the time snap value (e.g., $\frac{1}{4}^{th}$ bar), when the user selects the music cell at 4⅛ bar (e.g., $\frac{1}{8}^{th}$ bar past the 4 bar time snap boundary and within the $\frac{1}{4}^{th}$ bar threshold) then music application 104 can start the playback of the music cell at a $\frac{1}{8}^{th}$ bar offset from the beginning of the music cell so that the music cell can be played back as if started at the 4 bar time snap boundary. If the user selects the music cell at 4½ bar, then music application will start the selected music cell at the 6 bar time snap threshold since the user selected the music cell ½ bar past the 4 bar time snap boundary which is greater than the $\frac{1}{4}^{th}$ bar grace period.

Playback Graphics

FIG. 5 illustrates example graphical elements for music cells 500, 520, 530, and 540. In some implementations, music cell 500 can include playback position indicators 502 and 504. When music cell 500 is configured for looped playback of the corresponding music segment, music cell 500 can presented a circular representation 506 of the timeline for a single playback of the music segment of music cell 500 and playback indicators 502 and 504 (e.g., position lines) can have the appearance of hands of a clock. Playback indicator 502 can be, for example, a line that intersects a position on circle 506 corresponding to the beginning position (e.g., a position where the music segment begins playing) of the music segment of music cell 500 and that extends from the center of music cell 500 to a position (e.g., top center, 12 o'clock position) at the edge of music cell 500. Playback indicator 504 can be, for example, a line that intersects a position on circle 506 corresponding to the current playback position (e.g., a current position of playback of the music segment) of the music segment of music cell 500 and that extends from the center of music cell 500 to a position at the edge of music cell 500.

As the music segment of music cell 500 is played back by music application 104, playback indicator 504 can move around music cell 500 to indicate the current position in the music segment. When music cell 500 is playing in a forward direction, playback indicator 504 can move in a clockwise direction around music cell 500. When music cell 500 is playing in a backward direction, playback indicator 504 can move in a counter-clockwise direction.

In some implementations, application 104 can highlight portions of music cell 500 that have already been played. For example, when music cell 500 is playing in a forward direction and playback indicator 504 is moving in a clockwise direction, cell area 508 can be colored (e.g., shaded, highlighted, background color changed, etc.) to indicate that the portion of the music segment corresponding to cell area 508 has already been played. Cell area 510 corresponding to the unplayed portion (e.g., in the current loop iteration) can be colored differently than cell area 508 so that the user can visually distinguish between the played portions and the unplayed portions of the music segment of music cell 500.

In some implementations, music cell 520 can include playback position indicator 522. When music cell 520 is configured for single playback of the corresponding music segment, music cell 520 can present a linear representation 524 of the timeline for a single playback of the music segment of music cell 500. Playback indicator 522 can be moved along the timeline to indicate the current playback position of the corresponding music segment. For example, the left side of music cell 520 can correspond to the beginning of the music segment. The right side of music cell 520 can correspond to the end of the music segment. When music cell 520 is played back in the forward direction (e.g., from the beginning to the end of the music segment), then position indicator 522 can be moved from left to right across music cell 520 according to the playback position in the music segment. When music cell 520 is played back in the reverse direction (e.g., from the end to the beginning of the music segment), then position indicator 522 can be moved from right to left across music cell 520 according to the playback position in the music segment.

In some implementations, application 104 can highlight portions of music cell 520 that have already been played. For example, when music cell 520 is playing in a forward direction and playback indicator 522 is moving left to right, cell area 526 can be colored (e.g., shaded, highlighted, background color changed, etc.) to indicate that the portion of the music segment corresponding to cell area 526 has already been played. Cell area 528 corresponding to the unplayed portion of the music segment can be colored differently than cell area 526 so that the user can visually distinguish between the played portions and the unplayed portions of the music segment of music cell 520.

In some implementations, music cell 530 can include playback termination indicator 532. For example, playback termination indicator 532 can be presented on music cell 530 when music application 104 receives input to terminate playback of music cell 530. For example, the input to terminate playback of music cell 530 can be received when another cell in the same row as music cell 530 has been selected for playback by the user of computing device 102. Since music application 104 may continue playing music cell 530 after the selection of the other music cell is received, music application 104 can present playback termination indicator 532 to provide a visual indicator to the user that the selection of the other music cell has been received and that playback of music cell 530 will be terminated upon completion of the playback of the music segment corresponding to music cell 530.

In some implementations, music cell 540 can include playback activation indicator 542. For example, playback activation indicator 542 can be presented on music cell 540 when music application 104 receives input to initiate playback of music cell 540. For example, the input to initiate playback of music cell 540 can be received when music cell 540 has been selected for playback. Since music application 104 may continue playing another cell in the same row as music cell 540 after the selection of the music cell 540 is received, music application 104 can present playback activation indicator 542 to provide a visual indicator to the user that the selection of the music cell 540 has been received and that playback of music cell 540 will be commence upon completion of the playback of the music segment corresponding to the currently playing music cell in the same row as music cell 540.

Editing the Grid

Figure 6:
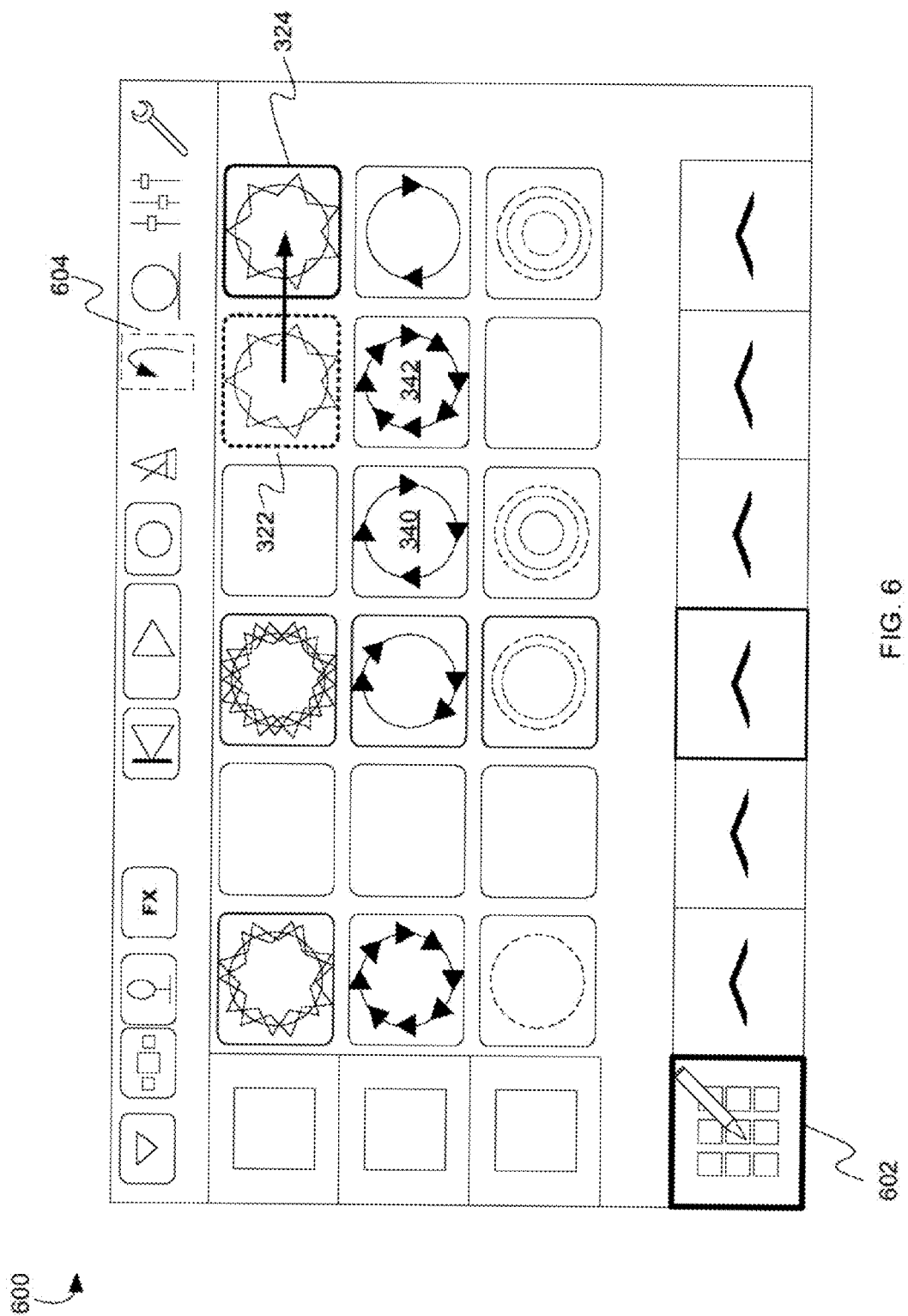
FIG. 6 illustrates an example graphical user interface for editing a grid of music cells.

FIG. 6 illustrates an example graphical user interface 600 for editing a grid of music cells. For example, GUI 600 can correspond to GUI 300 of FIG. 3. In some implementations, GUI 600 include graphical element 602 for placing GUI 600 into edit mode. For example, a user can select graphical element 602 to make the music cell grid presented by GUI 600 editable. Upon receiving the user selection of graphical element 602, music application 104 can transition GUI 600 from a playback mode to an edit mode. Music application 104 can interpret some of the user input that would have caused, for example, selection and playback of music cells in playback mode can now be interpreted as edit input. For example, whereas selecting and dragging in playback mode would cause a multiple selection of music cells for playback, selecting and dragging in edit mode can cause rearranging the music cells within the grid.

In some implementations, a user can move a music cell into another cell of the music cell grid. For example, a user can select music cell 322 and drag music cell 322 to empty cell 324 to move music cell 322 into a different column of the music cell grid. The user can undo the cell move (e.g., move the music cell back to its previous position in the grid) by selecting graphical element 604.

In some implementations, a user can combine music cells in the music cell grid. For example, the user can select music cell 340 and drag music cell 340 into music cell 342 to combine music cell 340 and music cell 342. For example, music application 104 can combine music cell 340 and music cell 342 by appending the music segment of music cell 340 to the music segment of music cell 342. Since music cell 340 is being added to music cell 342, the music cell settings of music cell 342 will control the playback of the aggregated music segments.

Figure 7:
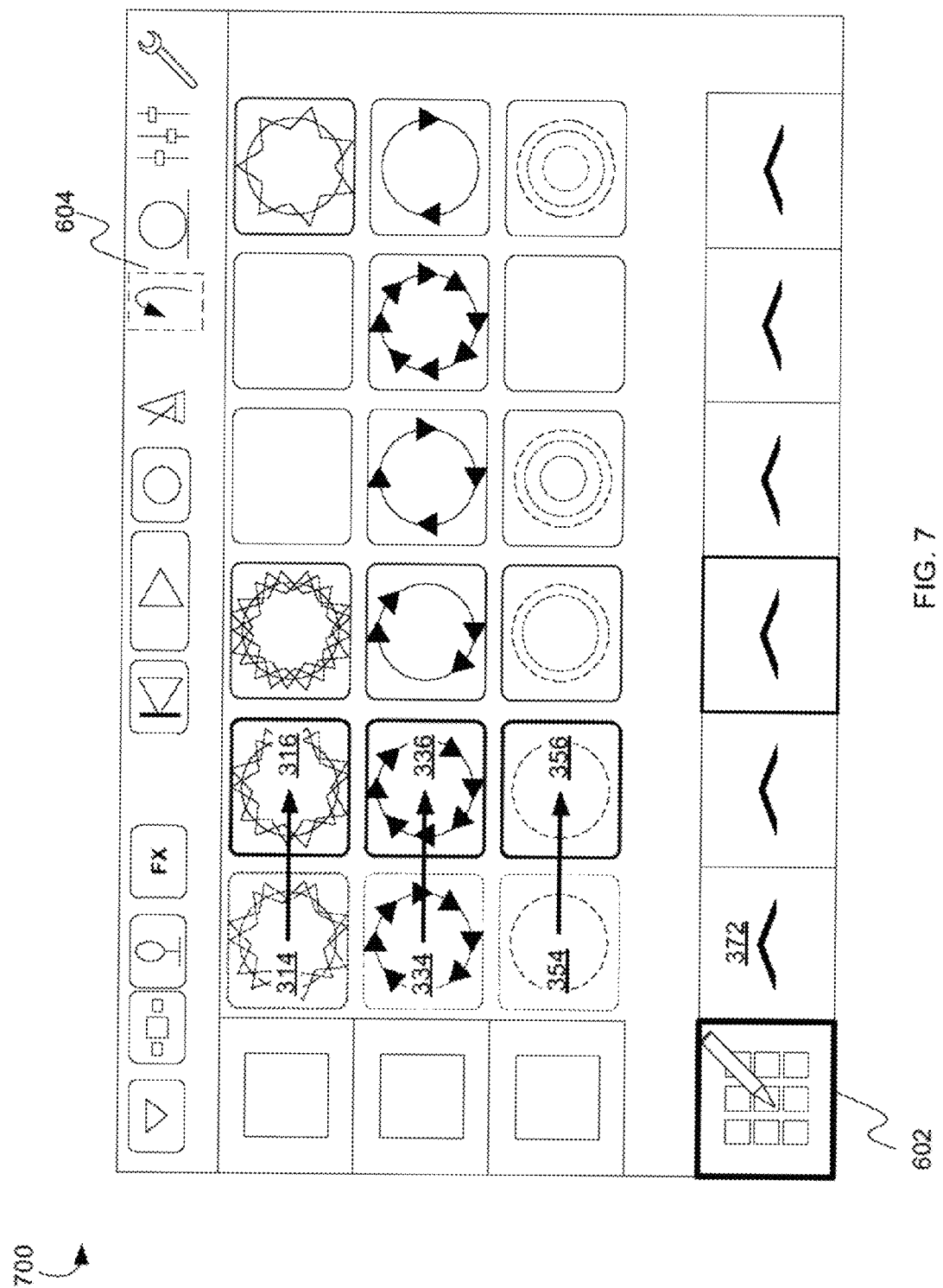
FIG. 7 illustrates an example graphical user interface for moving multiple cells in the music cell grid.

FIG. 7 illustrates an example graphical user interface 700 for moving multiple cells in the music cell grid. For example, GUI 700 can correspond to GUI 600 of FIG. 6. Similarly to GUI 600, a user can select graphical element 602 to put GUI 700 into edit mode. When in edit mode, a user can select multiple music cells and drag the selected cells into empty cells. For example, music application 104 can receive a selection of music cells 314, 334, 354. Music cells 314, 334 and 354 can be selected when music application 104 detects input (e.g., touch input) selecting music cell 314 and while continuing to receive the input, detects a selection of music cells 334 and 354. Alternatively, music cells 314, 334 and 354 can be selected when music application 104 detects input selecting column selector 372 while GUI 700 is in edit mode. After the multiple music cells are selected, music application 104 can detect a drag and drop input dragging the selected music cells 314, 334 and 354 into empty cells 316, 336, and 356, as illustrated by FIG. 7. The user can undo the cell move (e.g., move the music cells back to their previous positions in the grid) by selecting graphical element 604.

Editing Music Cells

Figure 8:
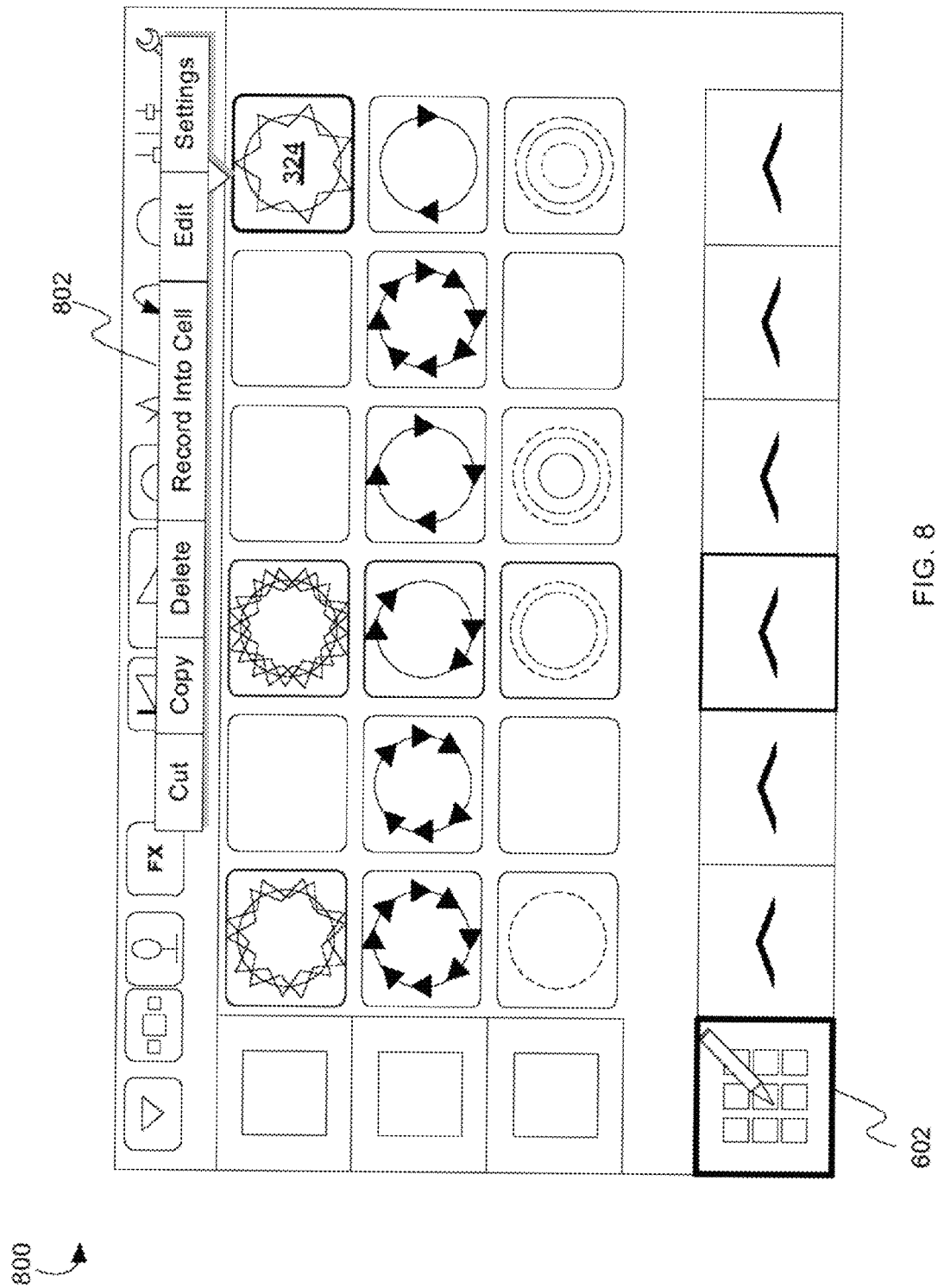
FIG. 8 illustrates an example graphical user interface for editing music cells.

FIG. 8 illustrates an example graphical user interface 800 for editing music cells. For example, GUI 800 can correspond to GUI 700 of FIG. 7. As described above, a user can select graphical element 602 to put GUI 800 into edit mode. While in edit mode, the user can select (e.g., tap, right click, etc.) music cell 324 to cause edit menu 802 to be presented on GUI 800. Edit menu 802 can include options for cutting (e.g., copy to memory and remove cell from grid), copying (e.g., copy to memory and leave cell in grid), and deleting music cell 324. Edit menu 802 can include options for recording audio and/or MIDI data into music cell 324, editing the recorded audio and/or MIDI data in the music cell, and/or editing the settings of music cell 324, as described in further detail below.

Editing Cell Settings

Figure 9:
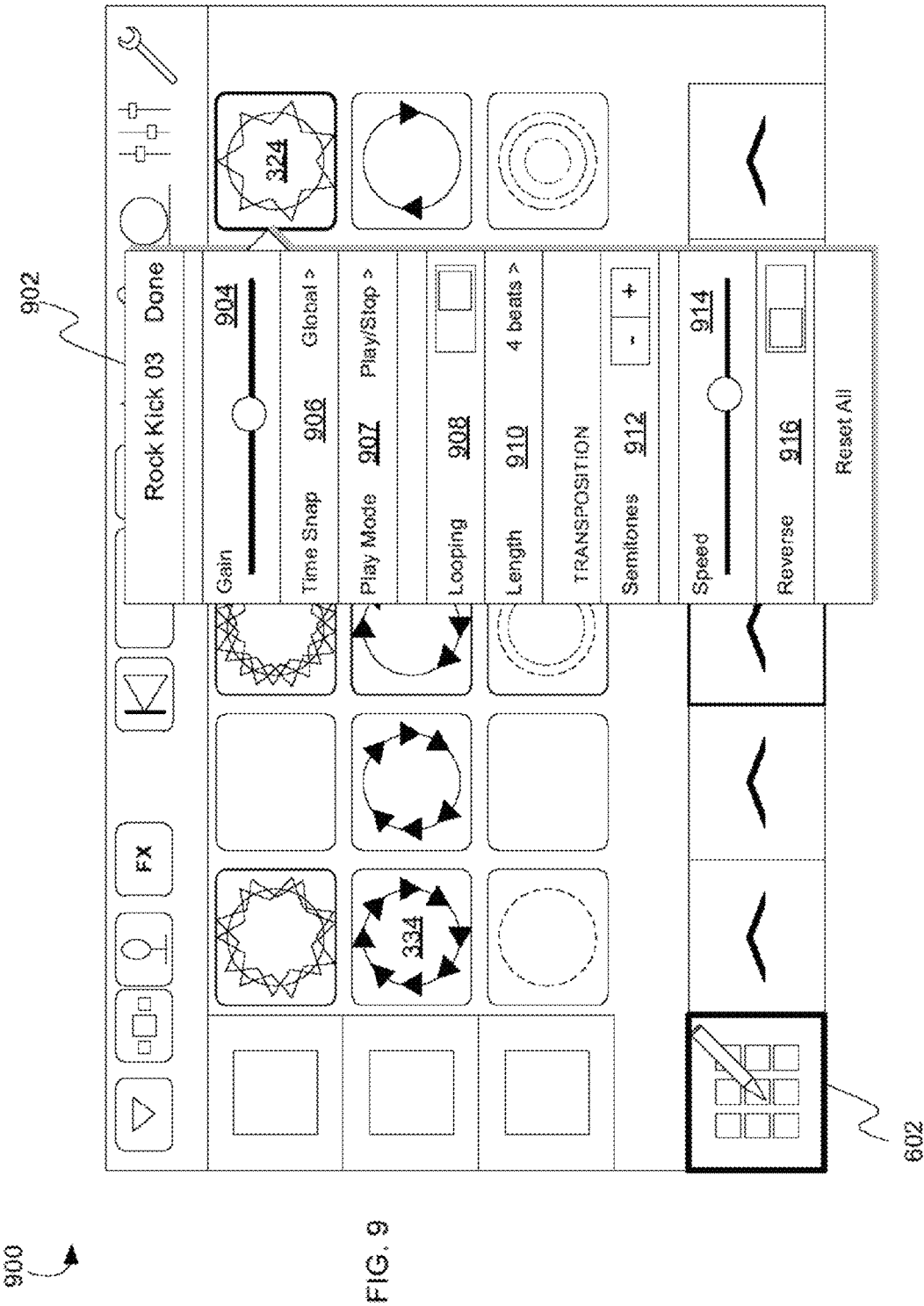
FIG. 9 illustrates an example graphical user interface for editing settings of music cells.

FIG. 9 illustrates an example graphical user interface 900 for editing settings of music cell 324. For example, GUI 900 can correspond to GUI 800 of FIG. 8. In some implementations, GUI 900 can include settings menu 902. For example, settings menu 902 can be presented by music application 104 on GUI 900 in response to receiving a user selection of the settings option of edit menu 802.

In some implementations, music cell settings can be modified while a music cell is being played back by music application 104. For example, a user can select music cell 324 and/or music cell 334 for playback. While music application 104 plays music cell 324 and/or music cell 334, the user can select the settings option of edit menu 802 to cause music application 104 to present settings menu 902. As the user adjusts the settings of music cell 324, music application 104 can playback the music segment of music cell 324 so that the user can observe the effect of the settings modifications on the playback of the music segment of music cell 324.

In some implementations, settings menu 902 can include a gain setting 904. For example, a user can provide input to adjust the gain setting 904 by manipulating a graphical element (e.g., slider, text box, etc.) presented on settings menu 902. When the music cell represents a MIDI instrument, gain setting 904 can be a velocity setting for the MIDI instrument.

In some implementations, settings menu 902 can include a time snap setting 906. For example, a user can select a time snap value that defines the time snap boundaries for synchronizing the playback of music cells, as described above.

In some implementations, settings menu 902 can include a play mode setting 907. The play mode setting can, for example, define what happens to a music cell when the user selects a music cell. The play mode setting can be different for different music cells. For example, the user can select a play/stop setting that acts as a toggle to play and stop a music cell when selected by the user. The user can select a play while held setting that causes a music cell to be played only while the user continues to provide input to the music cell. The user can select a retrigger setting that causes the music cell to start and/or restart playback when the user selects the music cell.

In some implementations, settings menu 902 can include a looping setting 908. For example, a user can provide input to looping setting 908 to toggle looping on and off. When looping is on, music cell 324 will playback the corresponding music segment as a continuous loop when music cell 324 is selected for playback. When looping is off, music cell 324 will playback the corresponding music segment once when music cell 324 is selected for playback.

In some implementations, settings menu 902 can include a length setting 910. For example, the user can interact with length setting 910 to specify the length of music cell 324. For example, if the user specifies that the length of music cell 324 is four beats, then one iteration through the corresponding music segment will be four beats long. When music cell 324 is selected for playback, the playback of one iteration (e.g., one playback) of the corresponding music segment will take 4 beats. If the user selects a length that is shorter than the music segment of the music cell, then the music segment can be trimmed down to the specified length. If the user selects a length that is longer than the music segment of the music cell, then a period of silence can be added to the playback of the music cell after the music segment to fill the additional time.

In some implementations, settings menu 902 can include a semitone transposition setting 912. For example, the user can provide input to setting 912 to specify the number of tones over which the corresponding music segment should be transposed when played back. The user can increase the tone or decrease the tone of the corresponding music segment by adjusting the semitone transposition setting 912 for music cell 324.

In some implementations, settings menu 902 can include a speed multiplier setting 914. For example, the user can provide input to settings menu 902 to adjust the speed multiplier for playback of the corresponding music segment of music cell 324. The user can set the multiplier to increase or decrease the speed of playback of the corresponding music segment.

In some implementations, settings menu 902 can include a reverse playback setting 916. For example, the user can provide input to reverse playback setting 916 to toggle the reverse playback setting on and off. When reverse playback is turned on, the corresponding music segment for music cell 324 will be played back in reverse when music cell 324 is selected. When reverse playback is turned off, the corresponding music segment for music cell 324 will be played back in the normal forward direction when music cell 324 is selected.

Editing Music Segments

Figure 10:
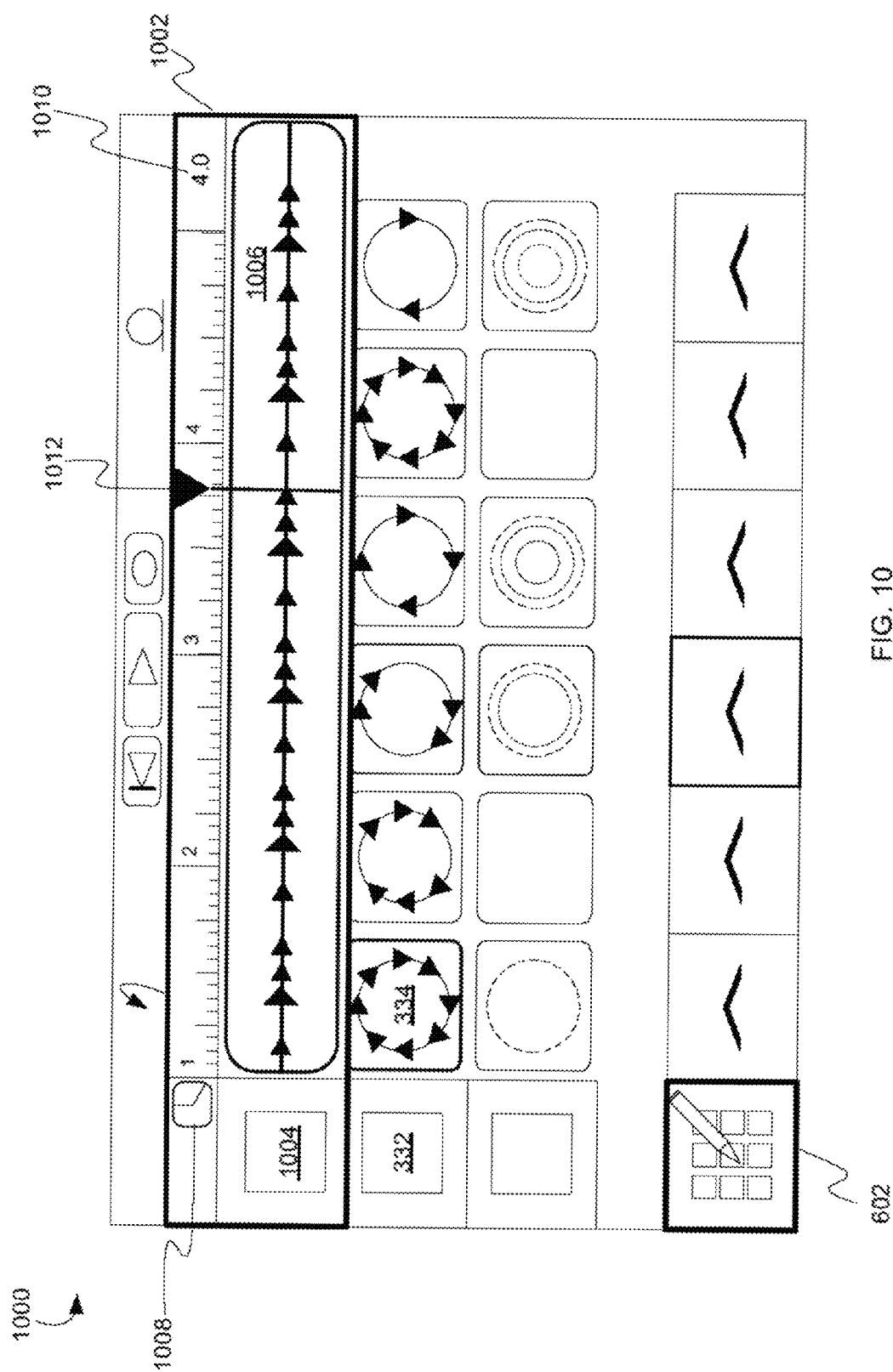
FIG. 10 illustrates an example graphical user interface for editing a music segment of a music cell.

FIG. 10 illustrates an example graphical user interface 1000 for editing a music segment of a music cell. For example, GUI 1000 can correspond to GUI 800 of FIG. 8. In some implementations, a user can select music cell 334 to cause edit menu 802 to be presented for music cell 334. The user can select the 'Edit' option presented on edit menu 802 to cause graphical element 1002 to be presented on GUI 1000.

In some implementations, a music cell can be edited while the music cell is being played back by music application 104. For example, a user can select music cell 334 for playback. While music application 104 is playing music cell 334, the user can select to edit music cell 334. Music application 104 can continue playing music cell 334 while the user edits the music segment of music cell 334.

In some implementations, graphical element 1002 can present information corresponding to the music segment of music cell 334. For example, graphical element 1002 can be an overlay presented over the music cell grid of GUI 1000. Graphical element 1002 can include graphical element 1004 that presents a representation of the musical instrument of music cell 334. For example, graphical element 1004 can correspond to graphical element 332 of FIG. 3.

In some implementations, graphical element 1002 can include graphical element 1008 representing music cell 334. For example, graphical element 1008 can be animated to indicate the portion of music cell 334 (e.g., corresponding music segment) that has been played back. For example, graphical element 1008 can present the clock-like animation for music cells described with reference to GUI 500 of FIG. 5. As the music segment of music cell 334 is played, the position indicators (e.g., clock hands) of graphical element 1008 can move around the cell representation of graphical element 1008 and a portion of the cell can be color coded to indicate which portion of the corresponding music segment has been played. In some implementations, graphical element 1002 can include cell length indicator 1010. For example, cell length indicator 1010 can indicate the length (e.g., 4 minutes, 4 beats, 4 bars, etc.) of music cell 334. The user can select cell length indicator 1010 to adjust the length of the cell (e.g., using a pulldown menu or other graphical object).

In some implementations, graphical element 1002 can present graphical element 1006 representing the music segment or music segments corresponding to music cell 334. For example, graphical element 1006 can present a waveform and/or timeline for the music segment of music cell 334 that represents the audio signal generated by the music segment. When music cell 334 is a MIDI instrument, graphical element 1006 can present MIDI data along a timeline representing the notes played by the MIDI instrument in the recorded music segment(s). If music cell 334 is being played back by music application 104, position indicator 1012 can move along the timeline and/or waveform to indicate the current playback position in the music segment.

In some implementations, a user can manipulate graphical element 1006 to edit the music segment corresponding to music cell 334. For example, the user can select and drag an edge (e.g., the right edge, the left edge) of graphical element 1006 to trim the music segment represented by graphical element 1006. Music application 1004 can continue playing back the music segment while the music segment is trimmed so that the user can observe how the changes to the music segment effect the playback of music cell 334. Similarly, the user can perform other editing operations (e.g., cut, copy, paste, undo, split, join, loop, delete, etc.) on the music segment(s) of music cell 334 while music cell 334 is being played back by music application 104. For example, the user can trim the music segment, as described above, then copy and paste the trimmed music segment into music cell 334 to create multiple segments that repeat the same portion of music.

Figure 11:
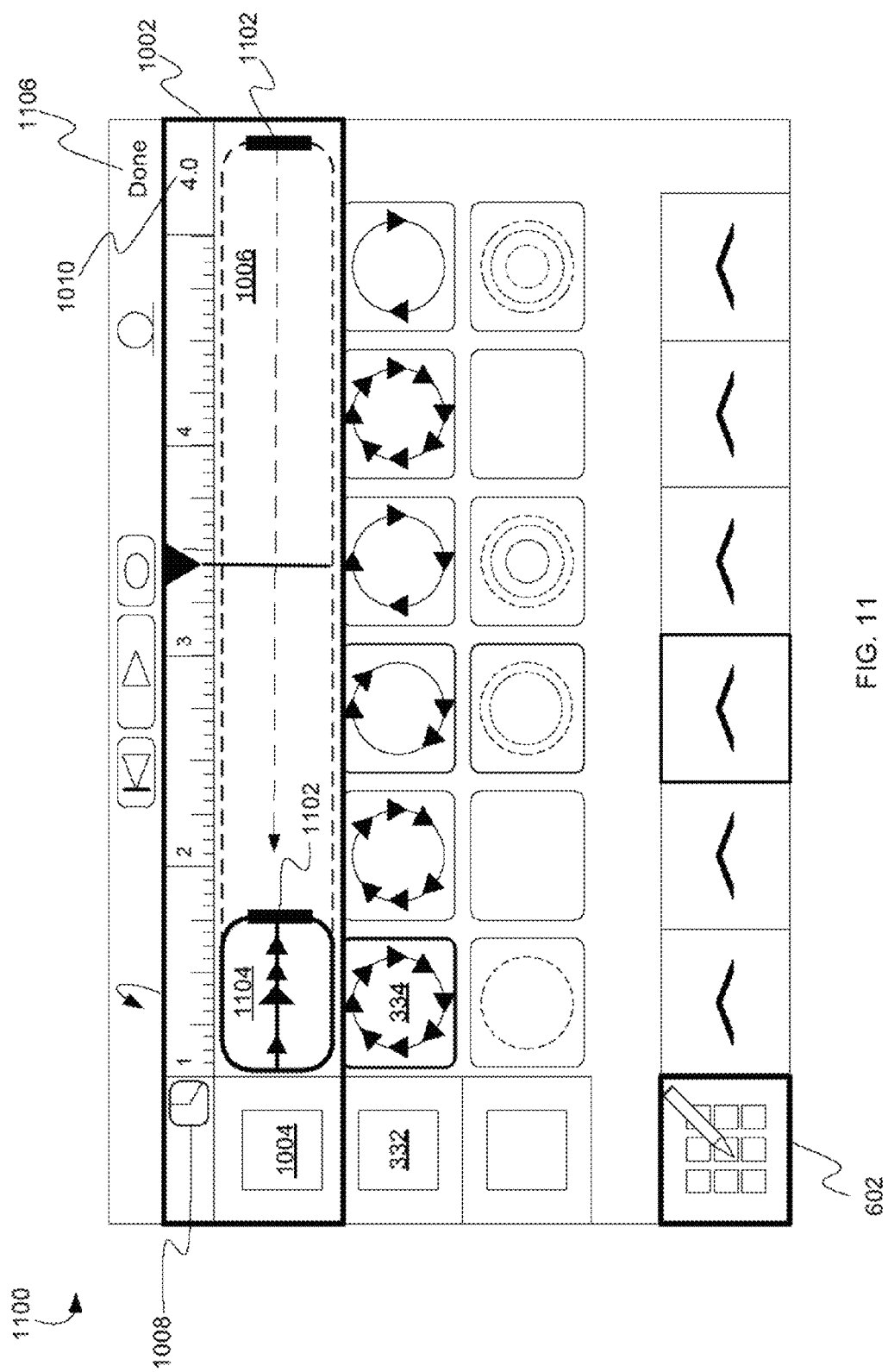
FIG. 11 illustrates an example graphical user interface for presenting an edited music cell.

FIG. 11 illustrates an example graphical user interface 1100 for presenting an edited music cell. For example, GUI 1100 can correspond to GUI 1000 of FIG. 10. As described above, a user can edit a music segment of music cell 334 by manipulating graphical element 1006. For example, a user can select and drag an edge of graphical element 1006 to trim the music segment represented by graphical element 1006. The user can, for example, select handle 1102 at an edge of graphical element 1006 and drag handle 1102 across graphical element 1002 to trim the music segment, as illustrated by graphical element 1102.

In some implementations, editing the music segment of music cell 334 will not affect the length of music cell 334. Thus, while the corresponding music segment may be less than a beat in length, a single playback iteration of music cell 334 is still four beats. For example, the portion of the playback time of music cell 334 that does not correspond to the music segment will produce no sound. Thus, in the example of FIG. 11, when played, music cell 334 will generate sound according to the edited music segment followed by silence for the remainder of the four beat length of music cell 334.

After the user is done editing the music segment of music cell 334, the user can save the edited music segment to music cell 334 by selecting graphical element 1106. For example, the user can select graphical element 1106 to indicate that the user is done editing music cell 334. Upon receiving the selection of graphical element 1106, music application 104 can save the edited music segment to music cell 334, as illustrated by FIG. 12.

Figure 12:
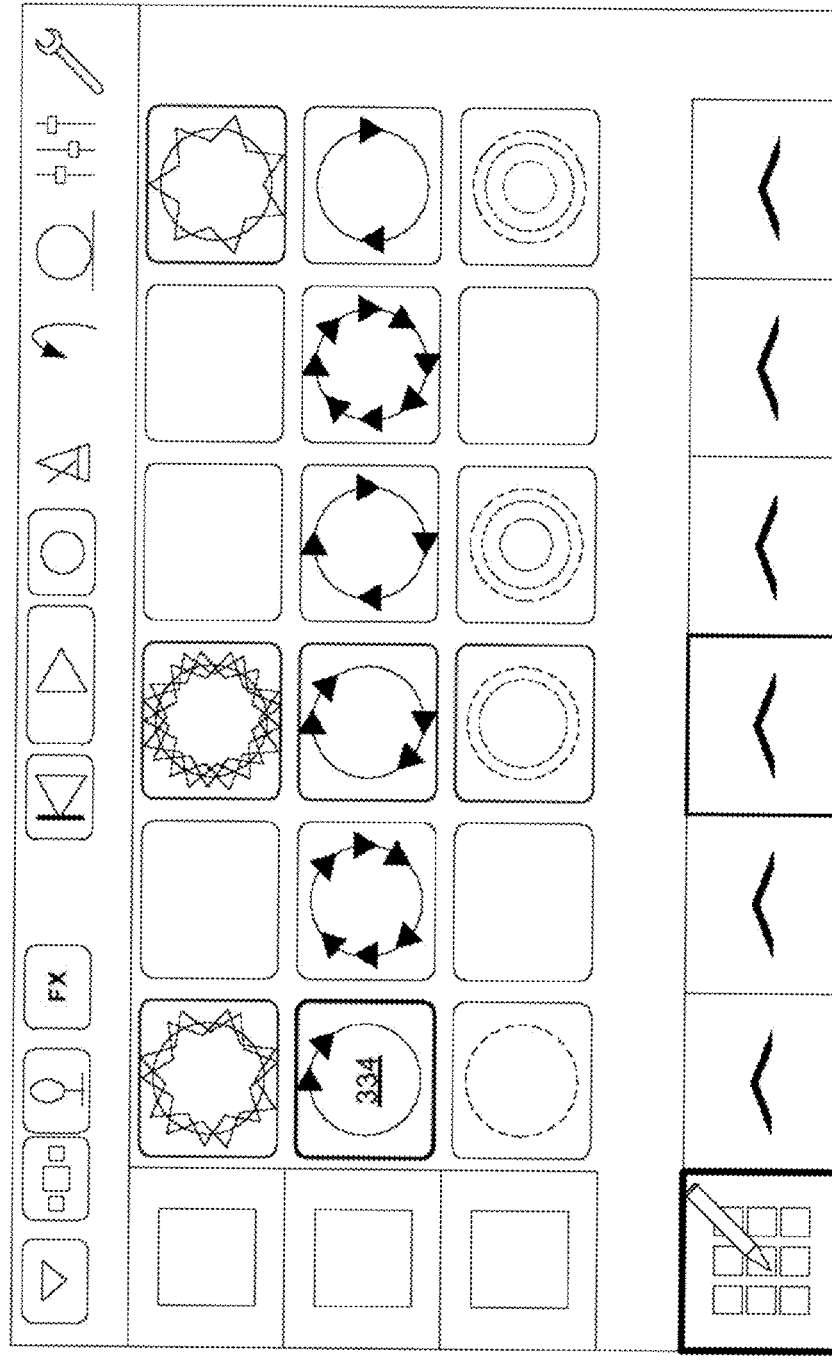
FIG. 12 illustrates an example graphical user interface presenting an edited music cell.

FIG. 12 illustrates an example graphical user interface 1200 presenting an edited music cell. For example, after the user edits the music segment of music cell 334 as described above with reference to FIG. 10 and FIG. 11, music application 104 can update music cell 334 to represent the edited music segment. For example, music application 104 can update the waveform and/or timeline presented on music cell 334 to represent the edited music segment. Since the music segment of music cell 334 was edited so that music cell 334 plays a short music segment followed by silence, the representation of music cell 334 on GUI 1200 presents a waveform and/or timeline that depicts an audio signal waveform at the beginning of the music cell timeline followed by silence (e.g., no audio waveform). Thus, the user can view a graphical representation of the edited music segment of music cell 334 on GUI 1200.

Figure 13:
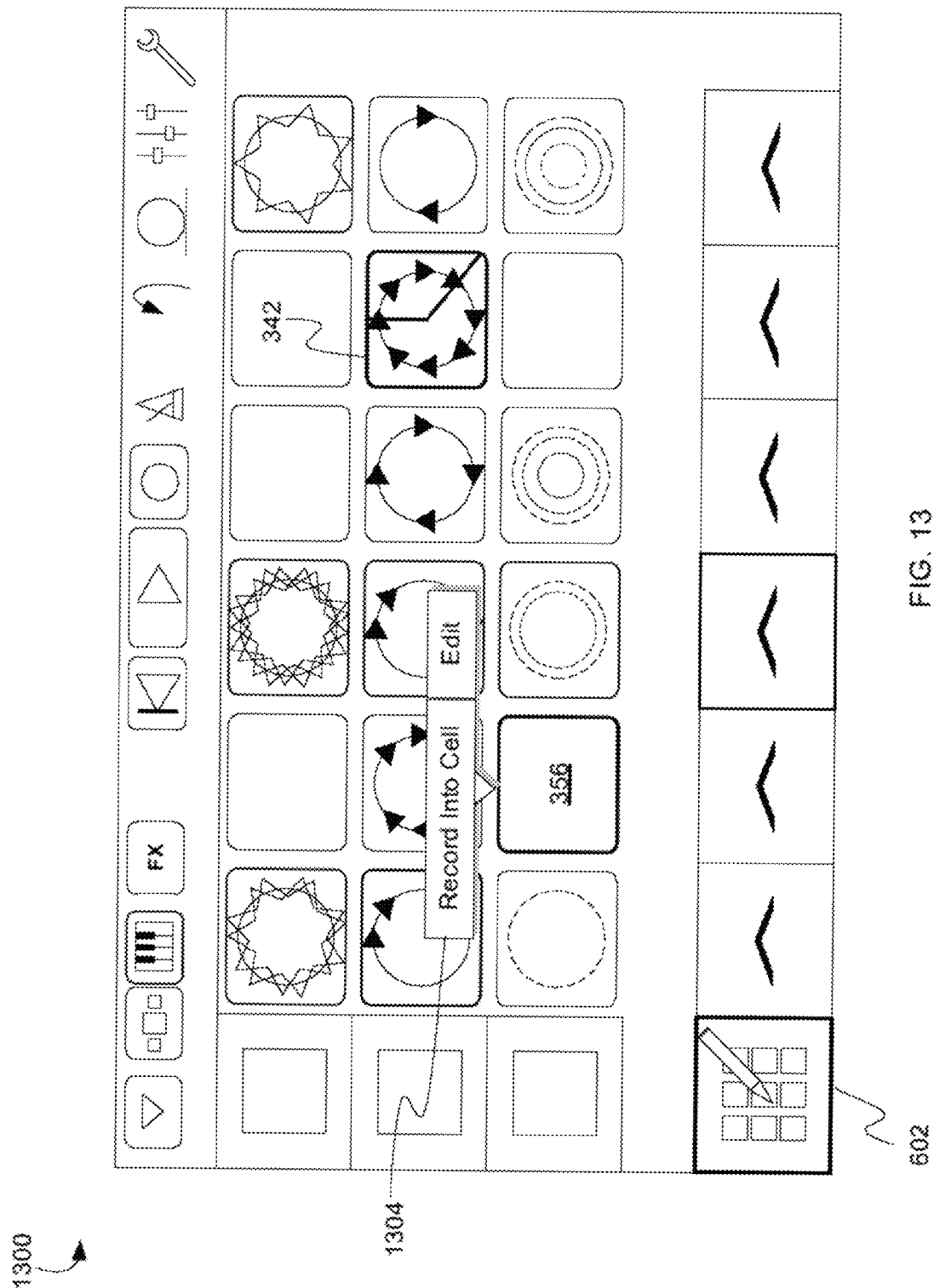
FIG. 13 illustrates an example graphical user interface for recording a music segment into a music cell.

FIG. 13 illustrates an example graphical user interface 1300 for recording a music segment into a music cell. For example, graphical user interface 1300 can correspond to graphical user interface 600 of FIG. 6. In some implementations, a user can select empty cell 356 to cause edit menu 1304 to be presented on GUI 1300. For example, edit menu 1304 can correspond to edit menu 802 of FIG. 8. The user input can include a touch input (e.g., a tap, brief touch, etc.) while GUI 1300 is in edit mode, as described above. The user can select the "Record into Cell" option presented on edit menu 1304 to invoke a graphical user interface for recording a new music segment into empty cell 356, as illustrated by FIG. 14.

In some implementations, music application 104 can playback a music cell while recording a music segment. For example, the user may wish to record a new music segment according to a drum beat or tempo of another cell. The user can select music cell 342, for example, before recording a new music segment for empty cell 1302. Music application 104 can playback music cell 342 (e.g., a percussion cell, drum beat, etc.) while the user records a new music segment into empty cell 356 so that the user can generate the new music segment by playing along with music cell 342.

Figure 14:
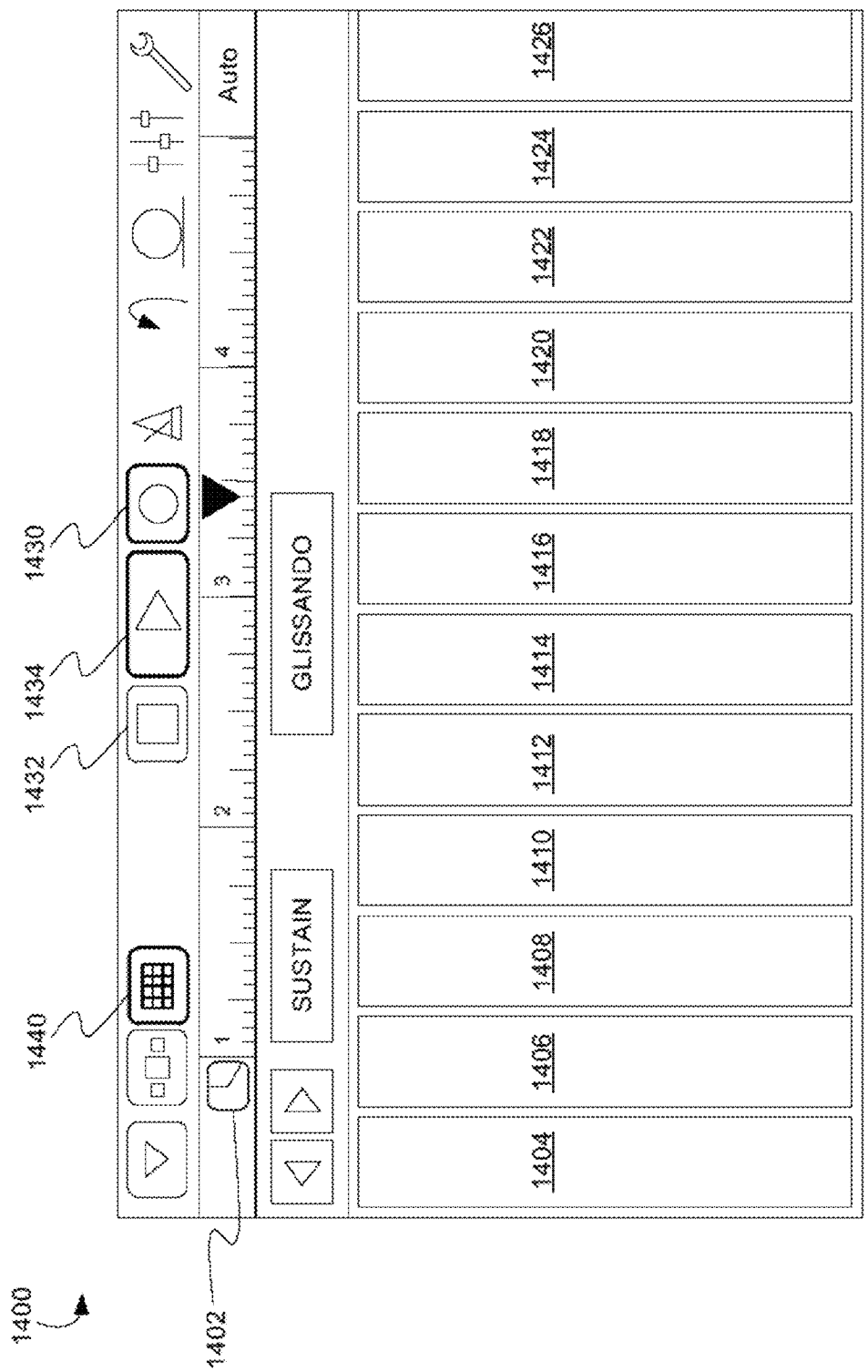
FIG. 14 illustrates an example graphical user interface for recording a music segment.

FIG. 14 illustrates an example graphical user interface 1400 for recording a music segment. For example, GUI 1400 can be presented in response to a user selecting the "Record into Cell" option presented on edit menu 1304. In some implementations, GUI 1400 can include graphical element 1402 indicating that GUI 1400 is being used to record into a music cell. Graphical element 1402 can be, for example, a graphical representation of a music cell.

In some implementations, GUI 1400 can present a representation of an instrument corresponding to the row of empty cell 1302. For example, if empty cell 356 is in a row corresponding to percussion instruments, then GUI 1400 can present a representation of a drum or drum set that the user can interact with to generate a music segment that includes a recording of a drum beat. If empty cell 356 is in a row corresponding to MIDI instrument, such as a keyboard, then GUI 1400 can present a representation of the MIDI instrument that the user can interact with to generate a music segment that includes a recording of the user's interaction with the MIDI instrument.

As illustrated by FIG. 14, GUI 1400 presents a manipulatable representation of a virtual keyboard instrument. For example, a user can play the virtual keyboard and generate keyboard music by selecting one or more keyboard keys 1404-1426. When the user wishes to record the keyboard music, the user can select graphical element 1430 to record the sounds generated by the keyboard as the user plays the keyboard. When the user is finished recording, the user can select graphical element 1432 to terminate the recording and save the recording as the music segment for empty cell 356. The user can playback the recorded music segment by selecting graphical element 1434, for example. The user can return to the music cell grid of GUI 1300 by selecting graphical element 1440.

Figure 15:
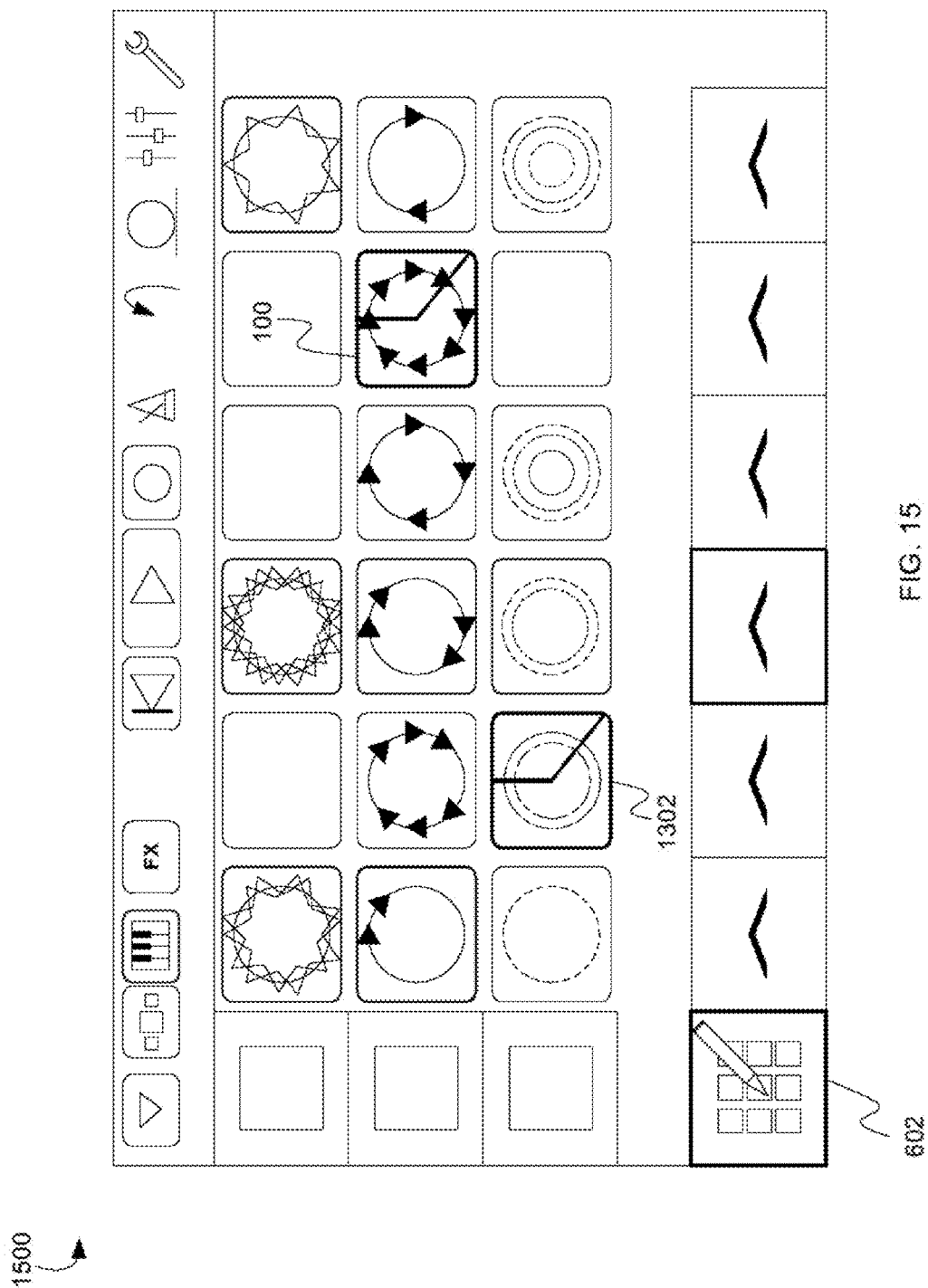
FIG. 15 illustrates an example graphical user interface presenting a new music segment recording in a music cell.

FIG. 15 illustrates an example graphical user interface 1500 presenting a new music segment recording in a music cell. For example, after the user records a new music segment for empty cell 356, as described above with reference to FIG. 14, music application 104 can store the recording in music cell 1302. Music application 104 can generate a circular or linear timeline and/or waveform representation for music cell 1302 according to the settings of music cell 1302 and present the timeline and/or waveform on music cell 1302 to indicate that music cell 1302 is no longer an empty cell. After the user is done editing the music cell grid and/or music cells, the user can select graphical element 602 to toggle GUI 1500 back to playback mode from edit mode.

Recording a Performance

Figure 16:
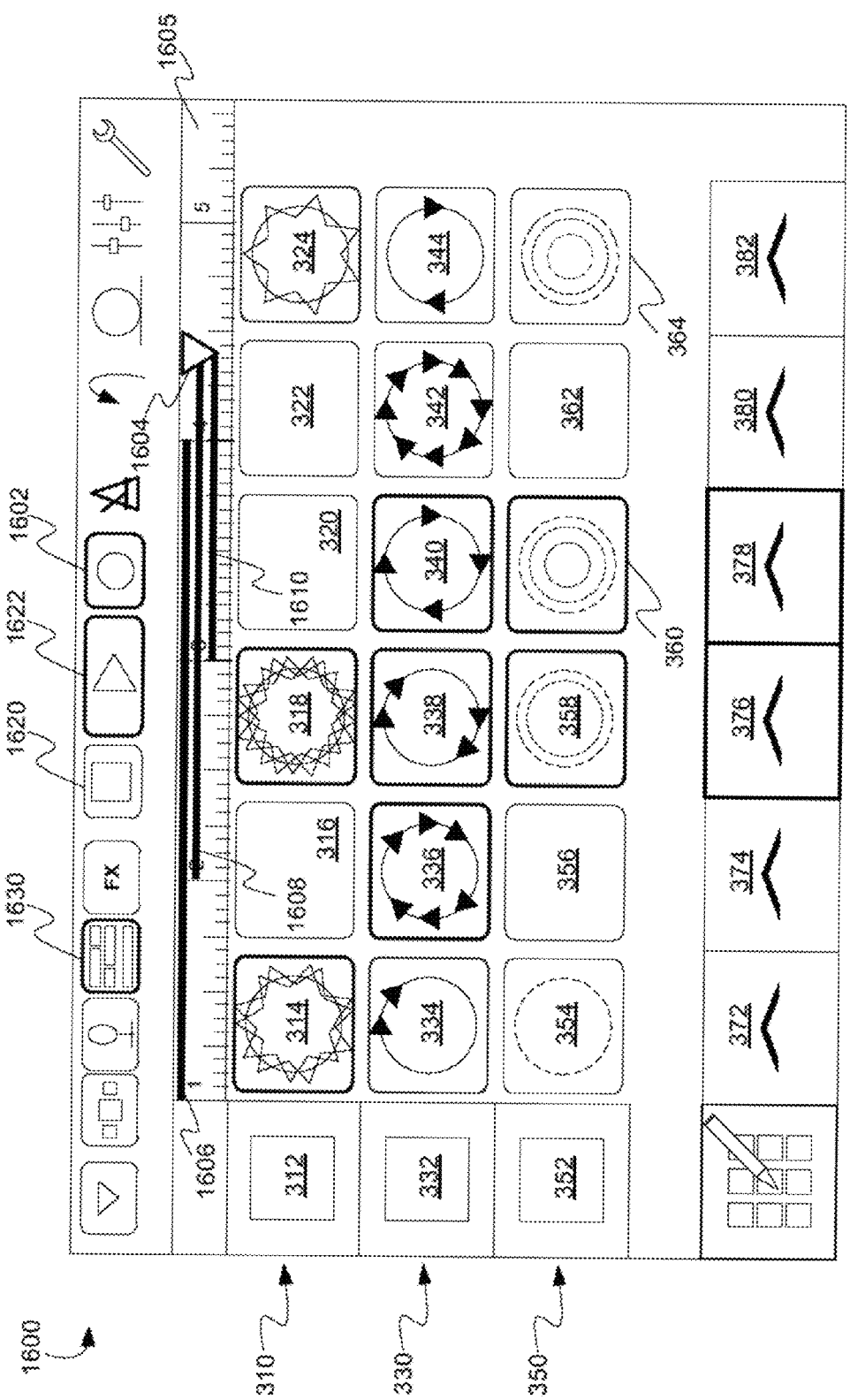
FIG. 16 illustrates an example graphical user interface for recording a musical performance generated from music cells.

FIG. 16 illustrates an example graphical user interface 1600 for recording a musical performance generated from music cells. For example, GUI 1600 can correspond to GUI 300 of FIG. 3.

In some implementations, a user can cause music application 104 to record playback of music cells using GUI 1600. For example, a user can initiate a recording of selected music cells by selecting graphical element 1602. In response to receiving the selection of graphical element 1602, music application 104 can begin recording the playback of music cells as the music cells are selected by the user. For example, after selecting graphical element 1602, the user can select music cell 314 to begin playback of the music segment of music cell 314 according to the settings of music cell 314, as described above.

After music cell 314 plays for a while (e.g., 1 beat, 1 bar, etc.), the user can select music cell 336. In response to the selection of music cell 336, music application 104 can initiate playback of music cell 336. Since no other music cell in row 310 has been selected and because music cell 314 is a looped music cell, music cell 314 continues to play. Also, because music application 104 is continuing to record, music application 104 is now recording the playback of music cell 314 and music cell 336.

After music cell 314 and music cell 336 play for a while longer (e.g., 1 beat, 1 bar, etc.), the user can select column selector 376 to cause the non-empty music cells in the same column as column selector 376 to playback. For example, in response to receiving the selection of column selector 376, music application 104 can initiate playback of music cells 318, 338, and 358. Because newly selected music cell 318 is in the same row as previously selected music cell 314, playback of music cell 314 can be terminated when music cell 318 begins playing. Similarly, playback of previously selected music cell 336 in row 330 can be terminated when music cell 338 in row 330 begins playing.

After music cells 318, 338 and 358 play for a while (e.g., 1 beat, 1 bar, etc.), the user can select music cell 318 to stop the playback of music cell 318. The user can also select column selector 378 to cause music cells 340 and 360 to begin playback. The selection of music cells 340 and 360 cause music cells 338 and 358 to stop playing because these music cells are in the same row as music cell 340 and music cell 360, respectively.

In some implementations, while music application 104 is recording the playback of the selected music cells, music application 104 can present playback position indicator 1604. For example, playback position indicator 104 can indicate the current position of the recording along timeline 1605. For example, timeline 1605 can measure time in minutes, bars, beats, or some other unit of measurement. If music application 104 has been recording for 3 bars (e.g., or 3 beats, or 3 minutes, etc.), for example, then playback position indicator 1604 can be positioned at the 3 bar mark in recording timeline 1605. Playback position indicator 1604 can move as the recording continues to indicate the current recording position in timeline 1605.

In some implementations, music application 104 can present a recorded row indicator in timeline 104. For example, as music application 104 is recording music cells, music application 104 can present an indication of which rows in the music cell grid are playing during different times in the recording. Music application 104 can, for example, present bars or lines in timeline 1605 indicating which rows 310, 330, and/or 350 are or were being recorded at a given time.

In some implementations, the row indicators (e.g., lines) can be ordered according to the arrangement of the corresponding rows. For example, line 1606 can correspond to the top most row 310, for example, and can be the top most line in timeline 1605. Line 1606 indicates during which parts of the recording timeline a music cell from row 310 was playing. For example, line 1606 indicates that row 310 was playing during the first 3 bars of the recording and was terminated at the beginning of bar 4. Line 1608 can correspond to the second row 330, for example, and can be the second line from the top in timeline 1605. Line 1608 indicates during which parts of the recording timeline a music cell from row 330 was playing. For example, line 1608 indicates that row 330 was playing during the second, third and fourth bars of the recording but not playing during the first bar. Similarly, line 1610 corresponds to the bottom row 350 and indicates during which part of the recording music cells from row 350 were playing.

When the user is finished recording, the user can select graphical element 1620 to stop recording the performance. For example, in response to receiving a user selection of graphical element 1620, music application 104 can stop recording and save the recorded performance in storage on computing device 102.

After the recording is stored, the user can then initiate playback the recorded performance by selecting graphical element 1622. For example, when playing back a recorded performance, timeline 1605 can present row indicators 1606, 1608 and/or 1610 so that the user can see which rows (e.g., instruments) were playing during each portion of the recorded performance.

In some implementations, row indicators 1606, 1608 and/or 1610 can be color coded according to the corresponding rows. As described above, rows 310, 330, and/or 350 can be colored according to the musical instruments represented by each row. Audio instruments can be colored blue, for example, while MIDI instruments are colored yellow. The recorded row indicators 1606, 1608 and/or 1610 can be colored according to the corresponding row. For example, if row 310 corresponds to an audio instrument and is colored blue, then row indicator 1606 can be colored blue. If row 350 corresponds to a MIDI instrument and is colored yellow, then row indicator 1610 can be colored yellow. Thus, the user can determine the type of instrument that is being recorded (or that was recorded) based on the coloring of row indicators 1606 1608 and/or 1610.

In some implementations, a user can select graphical element 1630 to cause music application 104 to present a detailed recording view on display 103 of computing device 102. For example, upon receiving a selection of graphical element 1630, music application 104 can present GUI 1700 of FIG. 17.

Reviewing a Recorded Performance

Figure 17:
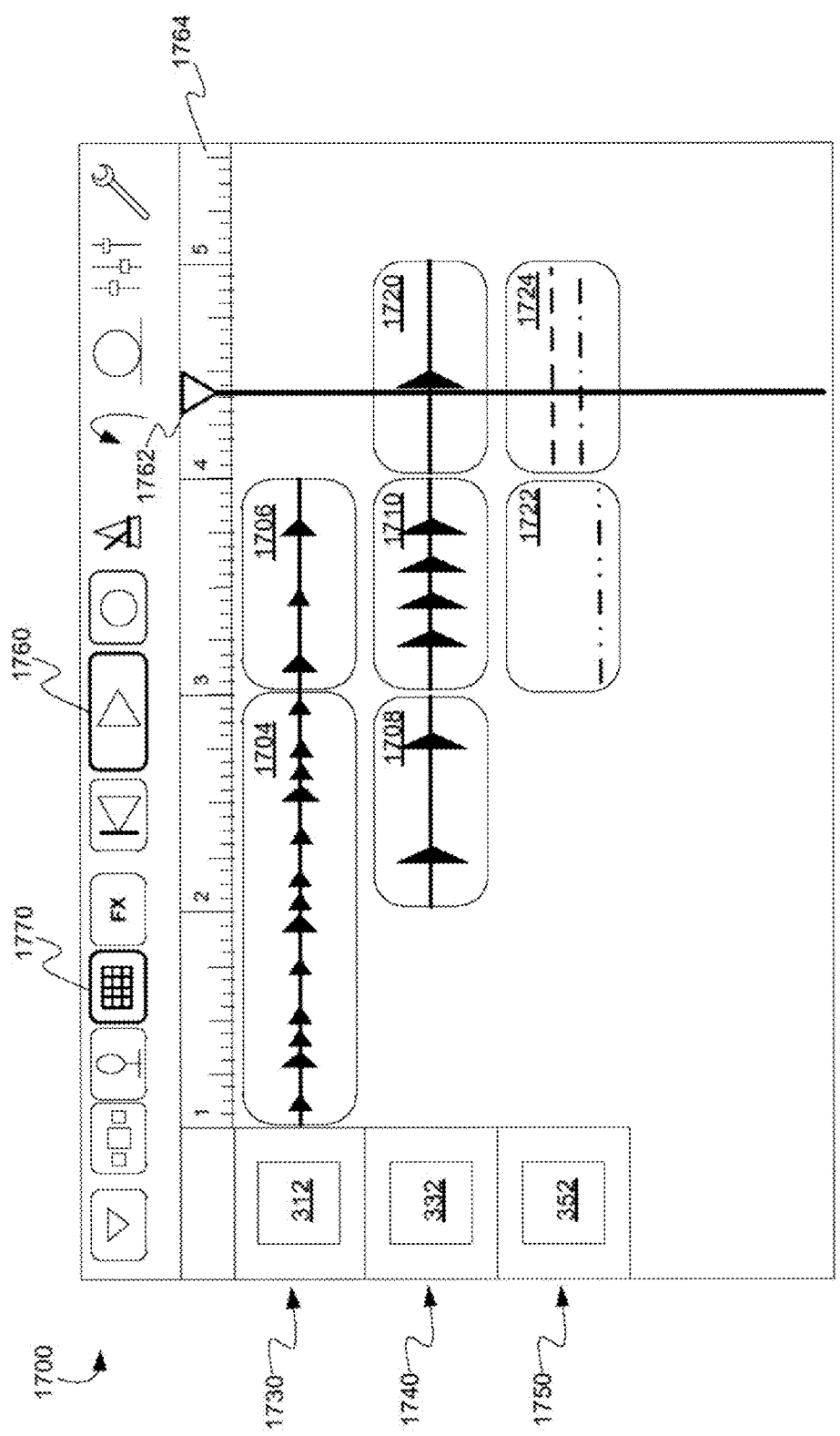
FIG. 17 illustrates an example graphical user interface presenting a detailed view of a performance recording.

FIG. 17 illustrates an example graphical user interface 1700 presenting a detailed view of a performance recording. For example, GUI 1700 can be presented on display 103 of computing device 102 in response to a user selecting graphical element 1630 of FIG. 16.

In some implementations, GUI 1700 can present representations of the recorded playback of music cells selected by the user when recording a music performance. For example, graphical elements 1704-1724 represent the recorded playback durations and corresponding audio waveforms for music cells played during the recorded performance described with respect to FIG. 16. The graphical elements 1704-1724 can be arranged on GUI 1700 in detail rows 1730, 1740, and 1750 corresponding to grid rows 310, 330, and 350, respectively. Graphical elements 1704-1724 can be presented in a detail view row on GUI 1700 corresponding to the grid row of the corresponding music cell. For example, detail rows 1730, 1740, and 1750 can be represented or identified by graphical elements 312, 332, and/or 352 corresponding to grid rows 310, 330, and 350, as described above.

Continuing the performance recording example of FIG. 16, GUI 1700 can include graphical element 1704 representing the recorded playback of music cell 314. As described above, music cell 314 corresponds to grid row 310 and is therefore presented in detail view row 1730 of GUI 1700. The recorded playback of music cell 314 spans two bars, therefore graphical element 1704 spans two bars on GUI 1700. The recorded playback of music cell 318 follows the playback of music cell 314 in grid row 310 and is represented by graphical element 1706 in row 1730.

Similarly, detail view row 1740 corresponding to grid row 330 includes graphical elements 1708, 1710 and 1720 representing the recorded playback of music cells 336, 338, and 340, respectively. Detail view row 1750 corresponding to grid row 350 includes graphical elements 1722 and 1724 representing the recorded playback of music cells 358 and 360, respectively.

In some implementations, a user can select graphical element 1760 to playback the recorded performance. For example, in response to receiving user input selecting graphical element 1760, music application 104 can playback the recorded performance, including the recorded playback of the music cells depicted by GUI 1700. While playing back the recorded performance, GUI 1700 can indicate the current playback location of the recorded performance using position indicator 1762. As music application 104 plays back the recorded performance, music application 104 can move position indicator 1762 along timeline 1764 to indicate the position of the currently playing portion of the recorded performance. When the user is finished with the detailed view of the recorded performance represented by GUI 1700, the user can select graphical element 1770 to return to the music cell grid of GUI 300.

Applying Audio Effects

Figure 18:
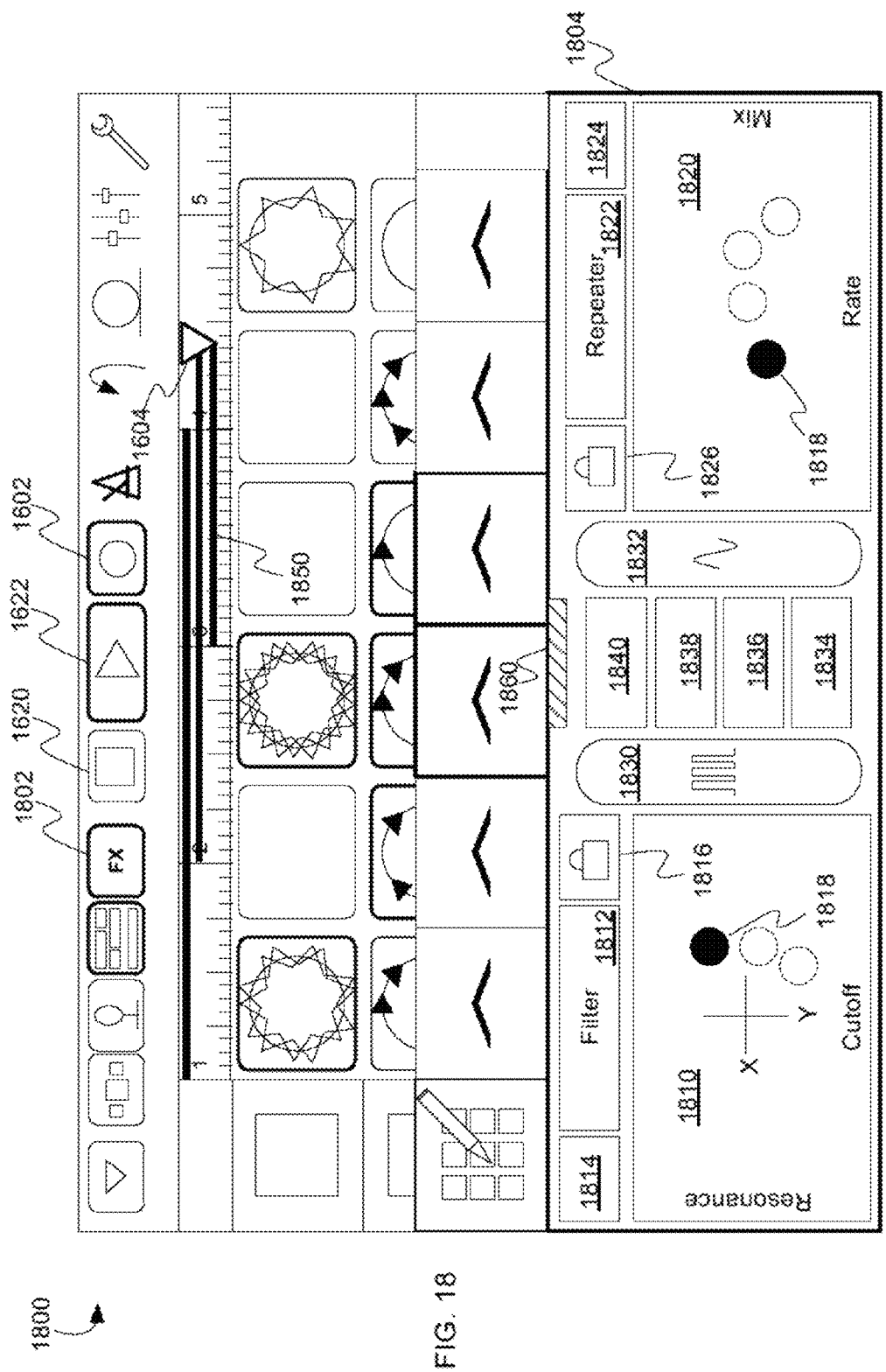
FIG. 18 illustrates an example graphical user interface for applying audio effects to the playback of music cells.

FIG. 18 illustrates an example graphical user interface 1800 for applying audio effects to the playback of music cells. For example, GUI 1800 can be presented on display 103 of computing device 102 in response to a user selecting audio effects graphical element 1802. In response to receiving the user selection of graphical element 1802, music application 104 can present audio effects panel 1804. For example, audio effects panel 1804 can be a graphical element (e.g., a window or overlay) that presents interactive graphical elements for applying various audio effects to the playback of music cells.

While audio effects are described herein with respect to modifying an audio signal or audio stream generated by music cells, the audio effects features described herein can be applied to an audio stream or audio signal generated by any audio application, apparatus, or system. This disclosure should not be interpreted as limiting the use of the audio effects features to audio generated by music cells.

In some implementations, while application 104 is playing and/or recording the playback of user selected music cells, as described with reference to FIG. 16, the user can provide input to the various graphical elements presented on panel 1804 to change the sound of the audio stream or audio signal generated from the music cells as the music cells are being played. The audio effects generated by the user's interaction with audio effects panel 1804 can be recorded by music application 104 along with the playback of the user selected music cells. GUI 1800 can present effect indicator 1850 (e.g., a line, a bar, etc.) indicating where in the recording audio effects were applied to the recorded music cell audio signals. For example, effect indicator 1850 can be color coded (e.g., purple) to indicate that effect indicator 1850 corresponds to audio effects.

In some implementations, audio effects panel 1804 can include graphical element 1810 for applying an audio effect to the playback of a music cell. For example, graphical element 1810 can be a two dimensional control (e.g., a touch pad) that a user can interact with to apply an audio effect to the audio signal generated during the playback of a music cell. The X and Y axis of the two dimensional control can correspond to two dimensions or attributes of an audio effect selected for manipulation by interaction with graphical element 1810, as identified by graphical element 1812. In the illustrated example, the audio effect currently controlled by graphical element 1810 is a filter effect where the X-axis of graphical element 1810 corresponds to a cutoff frequency attribute (e.g., first dimension) and the Y-axis corresponds to a resonance attribute (e.g., second dimension). The user can provide input 1818 (e.g., touch input) to graphical element 1810 to enable (e.g., turn on, activate, etc.) the audio effect and to specify the values for each attribute of the currently selected audio effect identified by graphical element 1812. For example, music application 104 can turn on the audio effect when the user touches graphical element 1810, and interpret the position of the user's touch input to generate values for each attribute of the audio effect.

In some implementations, effects panel 1804 can include graphical element 1816 for locking or holding an audio effect input. For example, the default behavior of the audio effects controls presented by audio effects panel 1804 is to generate audio effects while the user provides input to an audio effect control. When the user ceases providing the user input, the audio effect is terminated. However, the user may lock an audio effects control to cause the audio effect to be continuously generated even when the user ceases providing the user input. For example, as the user provides input 1818 to graphical element 1810, the user may find resonance and/or cutoff frequency attribute values for the filter effect that the user likes. The user can select graphical element 1816 to lock those audio effect attribute values in place so that the audio effect attribute values continue to be applied to the music cell playback. While the filter effect is locked, the user can interact with graphical element 1812 to select another audio effect (described with reference to FIG. 19) to manipulate using graphical element 1810. Thus, while the filter effect lock is active, the user can provide input to graphical element 1810 to manipulate another audio effect (e.g., an orbit effect). The user can unlock the filter effect by selecting graphical element 1816 to disengage the lock. The user can unlock all locked audio effects by selecting graphical element 1840 to reset the audio effects controls.

In some implementations, audio effects panel 1804 can include graphical element 1820 for applying an audio effect to the playback of a music cell. For example, graphical element 1820 can have similar features as graphical element 1810. By presenting graphical element 1810 and graphical element 1820, audio effects panel 1804 can provide a mechanism for the user to manipulate two or more audio effects simultaneously. For example, a user can manipulate the two dimensions or two attributes of the filter effect (identified by graphical element 1812) by interacting with graphical element 1810. The user can manipulate the two dimensions or two attributes (e.g., rate and mix) of the repeater effect (identified by graphical element 1822) by interacting with graphical element 1820. The user can lock attribute values of the effect associated with graphical element 1820 by selecting graphical element 1826, as described above with reference to graphical element 1816.

In some implementations, audio effects panel 1804 can include graphical element 1830 for manipulating an audio gate effect. For example, graphical element 1830 can be a one-dimensional control that allows the user to control when and to what degree audio passes through an audio channel. The user can, for example, interact with graphical element 1830 to adjust an audio gating parameter, such as the greater rate and/or speed. In some implementations, audio effects panel 1804 can include graphical element 1832 for applying a down sampling effect. For example, graphical element 1832 can be a one-dimensional control that allows the user to control the sampling rate of the playback of a selected music cell.

In some implementations, audio effects panel 1804 can include graphical element 1834 for invoking a tape stop audio effect. For example, in response to receiving a user selection of graphical element 1832, music application 104 can modify the audio signal of the currently playing music cells to simulate the sound of an audio tape or vinyl record being stopped while being played. The tape stop audio effect can last as long as the user continues to provide input (e.g. a continuous touch) to graphical element 1832. When the user ceases providing input to graphical element 1832, music application 104 can resume playing the selected music cells.

In some implementations, audio effects panel 1804 can include graphical element 1834 for invoking a turn table scratch audio effect. For example, in response to receiving a user selection of graphical element 1834, music application 104 can modify the audio signal of the currently playing music cells to simulate the sound of vinyl record scratched on a turn table. The turn table scratch audio effect can last as long as the user continues to provide input (e.g. a continuous touch) to graphical element 1834. When the user ceases providing input to graphical element 1834, music application 104 can resume playing the user selected music cells.

In some implementations, audio effects panel 1804 can include graphical element 1838 for invoking a reverser audio effect. For example, in response to receiving a user selection of graphical element 1838, music application 104 can play a previous portion of an audio signal in reverse. For example, when the user selects graphical element 1838, music application 104 can play the music just played by music application 104 immediately prior to the selection of graphical element 1838 in reverse. Music application 104 can continue playing in reverse (e.g., while rewinding to a previously played position) as long as the user continues to select (e.g., continues touching) graphical element 1838. When the user ceases providing input to graphical element 1834, music application 104 can resume playing the user selected music cells from the position reached in the music cell playback during the reverse playback.

Pressure Control

In some implementations, the user can invoke an audio effect by applying pressure to graphical element 1810 and/or graphical element 1820. As described above, graphical element 1810 and graphical element 1820 are two dimensional controls for applying audio effects to the audio generated when playing music cells. In some implementations, graphical elements 1810 and/or 1820 can be configured as three dimensional controls. For example, display 103 of computing device 102 can be a pressure sensitive display. Display 103 can incorporate a pressure sensor, for example. When the user touches graphical elements 1810 and/or 1820 and applies a threshold amount of pressure to graphical elements 1810 and/or 1820, music application 104 can interpret the pressure as an invocation of an audio effect. For example, when music application 104 detects that at least a threshold amount of pressure is applied to graphical element 1820, music application 104 can apply the tape stop effect, scratch effect, or reverse effect described above to the audio signal of the currently playing music cells.

Motion Control

In some implementations, music application 104 can apply audio effects based on the detected motion of computing device 102. For example, computing device 102 can include motion sensor 108. The user can tilt, rotate, shake, or otherwise move computing device 102 to cause motion sensor 108 to generate motion data. The motion data can be used by computing device to adjust the values of audio effect attributes when applying audio effects to audio signals generated by the playback of music cells.

In some implementations, audio effects panel 1804 can include graphical element 1814 for engaging motion control for graphical element 1810. A user can select graphical element 1814 to enable motion control for the two dimensional control represented by graphical element 1810. When motion control is enabled, the user can tilt or otherwise move computing device 102 to cause the X and/or Y axis attribute values of the corresponding effect to adjust according to the movement of computing device 102. For example, when graphical element 1810 is associated with the filter effect, tilting or rotating computing device 102 along the X-axis of graphical element 1810 can increase and/or decrease the resonance value of the filter effect. Tilting or rotating computing device 102 along the Y-axis of graphical element 1810 can increase and/or decrease the cutoff value of the filter effect.

In some implementations, audio effects panel 1804 can include graphical element 1824 for engaging motion control for graphical element 1820. A user can select graphical element 1824 to enable motion control for the two dimensional control represented by graphical element 1820. When motion control is enabled, the user can tilt or otherwise move computing device 102 to cause the X and/or Y axis attribute values of the corresponding effect to adjust according to the movement of computing device 102. For example, when graphical element 1820 is associated with the repeater effect, tilting or rotating computing device 102 along the X-axis of graphical element 1820 can increase and/or decrease the mix value of the repeater effect. Tilting or rotating computing device 102 along the Y-axis of graphical element 1820 can increase and/or decrease the rate value of the repeater effect.

In some implementations, motion control can be applied to audio effects at different rates. For example, the filter effect and the repeater effect can be configured with different motion speed factors. The filter effect can have a speed factor of one (1), while the repeater effect may have a speed factor of three (3). When motion control is engaged for the two-dimensional controls associated with the filter effect and/or repeater effect, the motion sensor data generated by moving computing device 102 can be applied to each audio effect according to the speed factor configured for the audio effect. For example, motion sensor data will cause the filter effect attribute values to change at a slower rate (1×) than the filter attribute values of the repeater effect (3×). The values for the repeater effect will change 3 times faster than the values for the filter effect, for example. The user can adjust the speed factors for each audio effect to cause music application 104 to generate different audio effects based on the same motion input.

In some implementations, motion control can be used to manipulate a hidden audio effect. For example, display 103 of computing device 102 may not be big enough to display two two-dimensional audio effect controls (e.g., graphical element 1810 and graphical element 1820). In this case, music application 104 can present a single graphical element 1810 to allow the user two-dimensional control of an audio effect. However, the use may still wish to apply two different two-dimensional audio effects simultaneously. To do so, the user can select a first audio effect (e.g., filter effect) and enable motion control by selecting graphical element 1814 and persistently turning on motion control for the first audio effect by selecting graphical element 1816. After motion control is enabled for the first audio effect, the user can select a second audio effect (e.g., repeater effect) to control using graphical element 1810. After the second audio effect is selected, the user can provide input to graphical element 1810 to adjust the second audio effect to modify the music cell audio signals while moving computing device 102 to adjust the first audio effect to modify the music cell audio signals. Thus, the user can apply two different audio effects to the music cell audio signals even though only a single two-dimensional audio effect control is presented by GUI 1800.

Audio Effect Animations

In some implementations, user input with respect to an audio effect can cause an animation to be presented by GUI 1800. For example, when the user provides input to graphical element 1810, music application 104 can present an animation indicating the location of the input and/or a trail that indicates the path of the user input on graphical element 1810. Similarly, when the user provides input to graphical element 1820, music application 104 can present an animation indicating the location of the input and/or a trail that indicates the path of the user input on graphical element 1810. Likewise, when the user provides input to graphical element 1830 and/or 1832 to adjust the gating effect and/or down sampling effect, respectively, an animation can be presented to indicate the location in graphical element 1830 and/or graphical element 1832 where the user has provided the touch input. When the user selects graphical element 1834, 1836 or 1938, the selected graphical element can be highlighted to indicate that the graphical element has been selected.

Audio Effect Layering

In some implementations, music application 104 can apply layers of audio effects based on when each audio effect is invoked by the user. For example, the user can cause music application 104 to layer audio effects selecting audio effect lock element 1816 (1826) and/or by continuously selecting (e.g., select and hold) an audio effect graphical element.

In some implementations, a user can layer audio effects using effect lock graphical element 1816. For example, to use effect lock element 1816 to layer audio effects, the user can provide input to graphical element 1820 to invoke the repeater effect. While providing input to graphical element 1820, the user can select graphical element 1826 to lock the repeater effect attribute values so that the repeater effect is continuously applied to the audio signal generated by the selected music cells. The user can then interact with graphical element 1810 to invoke the filter audio effect. For example, the modified audio signal generated by applying the repeater effect can be provided as input to the filter audio effect such that the filter audio effect modifies the repeater modified audio signal. Since the repeater audio effect of graphical element 1820 has been locked in, the user can select graphical element 1822 to select another audio effect (e.g., an orbit effect) to manipulate using graphical element 1822. While the user continues to provide input to graphical element 1810, the user can manipulate graphical element 1822 to apply another audio effect to the audio signal modified firstly by the repeater effect and secondly by the filter effect. Thus, the user can apply three layers of audio effects to an audio signal generated by music cell playback. For example the order in which the audio effects are applied to an audio signal can affect how the resulting modified audio signal sounds. Therefore, when layering audio effects on an audio signal, the order of application matters.

In some implementations, a user can layer audio effects using overlapping input. For example, to use overlapping input to layer audio effects, the user can provide input to graphical element 1820 to invoke the repeater effect. While continuing to provide input to graphical element 1820, the user can then interact with graphical element 1810 to invoke the filter audio effect. For example, the modified audio signal generated by applying the repeater effect can be provided as input to the filter audio effect such that the filter audio effect modifies the repeater modified audio signal. Since the filter audio effect is modifying the repeater modified signal, the audio signal generated by the filter audio effect includes both the repeater effect and the filter effect. After the user applies the filter effect, the user can cease the input to graphical element 1820 and select graphical element 1822 to select another audio effect (e.g., an orbit effect) to manipulate using graphical element 1822. While the user continues to provide input to graphical element 1810, the user can manipulate graphical element 1822 to apply another audio effect to the audio signal modified firstly by the repeater effect and secondly by the filter effect. Thus, the user can apply three layers of audio effects to an audio signal generated by music cell playback. For example the order in which the audio effects are applied to an audio signal can affect how the resulting modified audio signal sounds. Therefore, when layering audio effects on an audio signal, the order of application matters.

Selecting Audio Effects

Figure 19:
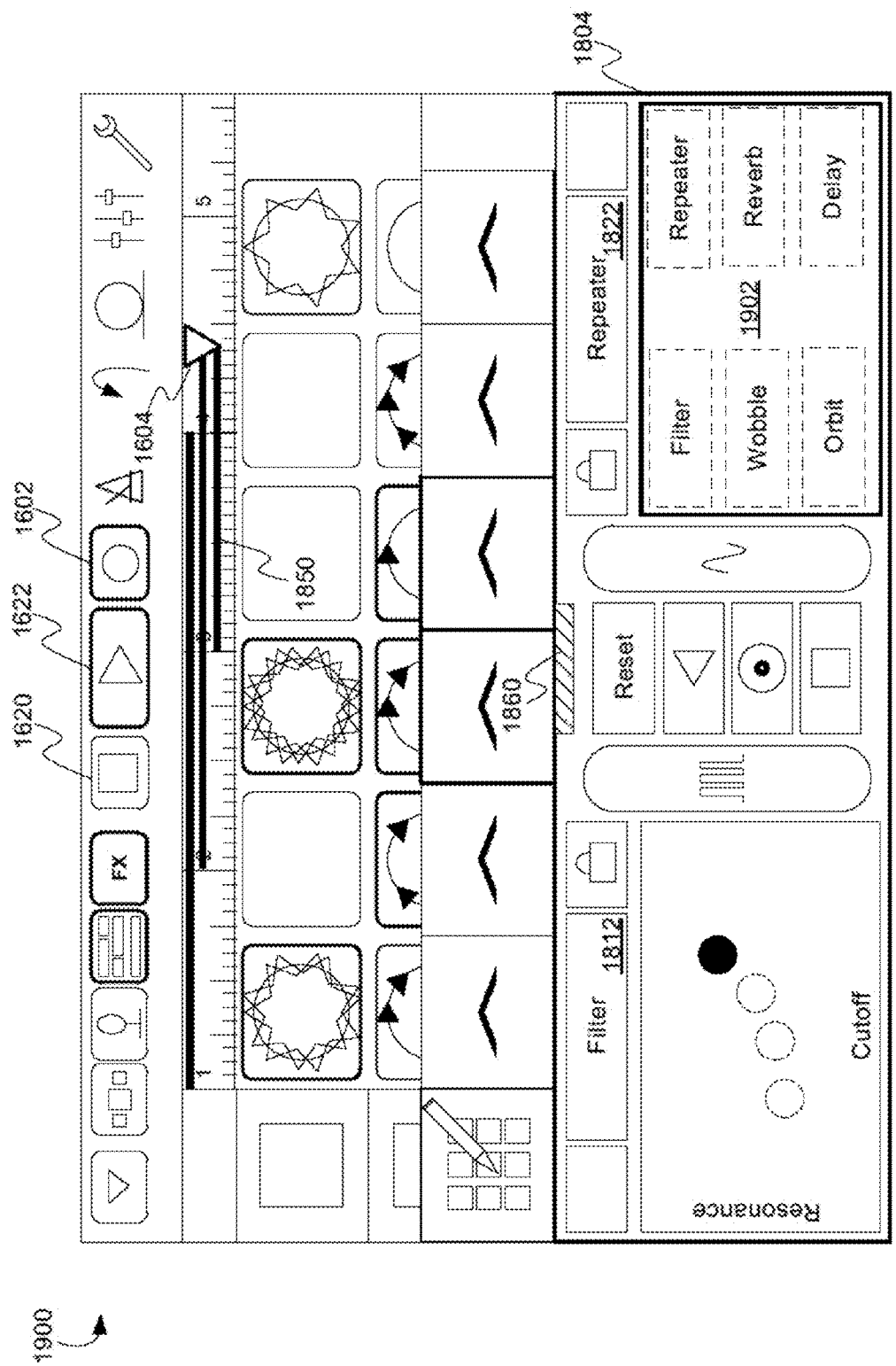
FIG. 19 illustrates an example graphical user interface for selecting audio effects.

FIG. 19 illustrates an example graphical user interface 1900 for selecting audio effects. For example, a user can select graphical element 1822 to cause music application 104 to present audio effect menu 1902 on GUI 1900. In some implementations, a user can provide a single continuous input to select graphical element 1822 and one of the audio effects listed on audio effect menu 1902. For example, a user can touch graphical element 1822 to cause GUI 1900 to present effect menu 1902. The user can continue providing the touch input while sliding (e.g., dragging) the touch input to an identifier of one of the audio effects listed on menu 1902 to select the corresponding audio effect. When the user ceases the touch input, music application 104 can hide audio effect menu 1902 and associate the selected audio effect with graphical element 1820 so that the user can use graphical element 1820 to control the selected audio effect. The user can interact with graphical element 1812 similarly to select an audio effect for graphical element 1810.

In some implementations, audio effect menu 1902 can include a filter effect. For example, the filter effect can include a resonance attribute and a cutoff attribute. The filter effect can be a combination of two filters of different types (e.g., a low pass filter and a high pass filter) that share the cutoff and resonance attributes. The user can manipulate each attribute by interacting with graphical element 1810 (or graphical element 1820). The resonance attribute and/or cutoff attribute can each be oriented along a respective one of the two dimensions of graphical element 1810. The user can provide input (e.g., touch input) to select a location on graphical element 1810. The X and Y values of the location on graphical element 1810 can be translated into values for the resonance and cutoff attributes. The resonance and cutoff attribute values can be used by music application 104 to adjust the audio signal of the playing music cells.

In some implementations, audio effect menu 1902 can include a repeater effect. For example, the repeater effect can have rate and mix attributes. The rate attribute can specify the rate at which a portion of audio is repeated. The mix attribute can specify the size or amount of audio that should be repeated. The rate and/or mix attributes can each be oriented along a respective one of the two dimensions of graphical element 1810. The user can provide input (e.g., touch input) to select a location on graphical element 1810. The X and Y values of the location on graphical element 1810 can be translated into values for the rate and mix attributes. The rate and mix values can be used by music application 104 to adjust the repeater effect when applied to audio signal of the playing music cells.

In some implementations, audio effect menu 1902 can include a wobble effect. For example, the wobble effect can modulate the frequency of an audio signal generated by music cells to generate a wobble sound. The wobble effect can be implemented using a low-frequency oscillator to modulate the cutoff frequency of a filter that is filtering the audio signal. The attributes of the wobble effect can include frequency, phase, and/or amplification. The wobble effect attributes can be oriented along a respective one of the two dimensions of graphical element 1810. The user can provide input (e.g., touch input) to select a location on graphical element 1810. The X and Y values of the location on graphical element 1810 can be translated into values for the wobble effect attributes. The wobble effect attribute values can be used by music application 104 to adjust the wobble effect when applied to audio signal of the playing music cells.

The descriptions of the audio effects below are presented with reference to the two-dimensional control of graphical element 1810, however, the audio effects can be configured for use or manipulation through the two-dimensional control of graphical element 1820. For example, graphical element 1810 and graphical element 1820 may be functionally identical controls configured to manipulate different audio effects.

In some implementations, audio effect menu 1902 can include a reverb effect. For example, the reverb effect can adjust an audio signal generated by music cells to generate a reverberation or echo effect. The attributes of the reverb effect can include delay time, decay time, and/or other attributes. The reverb effect attributes can be oriented along a respective one of the two dimensions of graphical element 1810. The user can provide input (e.g., touch input) to select a location on graphical element 1810. The X and Y values of the location on graphical element 1810 can be translated into values for the reverb effect attributes. The reverb effect attribute values can be used by music application 104 to adjust the reverb effect when applied to audio signal of the playing music cells.

In some implementations, audio effect menu 1902 can include an orbit effect. For example, the attributes of the orbit effect can include a flanging effect, a chorus effect, and/or a phasing effect. The flanging/chorus effects can be oriented along the Y axis, for example, and phasing effects can be oriented along the X axis of graphical element 1810. For example, one half of the Y-axis can engage the flanger effect while the other half of the Y-axis can engage the chorus effect. The user can provide input (e.g., touch input) to select a location on graphical element 1810. The X and Y values of the location on graphical element 1810 can be translated into values for the flanging/chorus effect and phasing effect attributes. The flanging and phasing effect attribute values can be used by music application 104 to adjust the orbit effect when applied to audio signal of the playing music cells.

In some implementations, the user can select a delay effect. For example, the attributes of the delay effect can include a delay time, amplitude change, feedback, delay range, and/or other delay attributes. The delay effects can be oriented along a respective one of the two dimensions of graphical element 1810. The user can provide input (e.g., touch input) to select a location on graphical element 1810. The X and Y values of the location on graphical element 1810 can be translated into values for the delay effect attributes. The delay effect attribute values can be used by music application 104 to adjust the delay effect when applied to the audio signal of the playing music cells.

Minimized Audio Effects Panel

Figure 20:
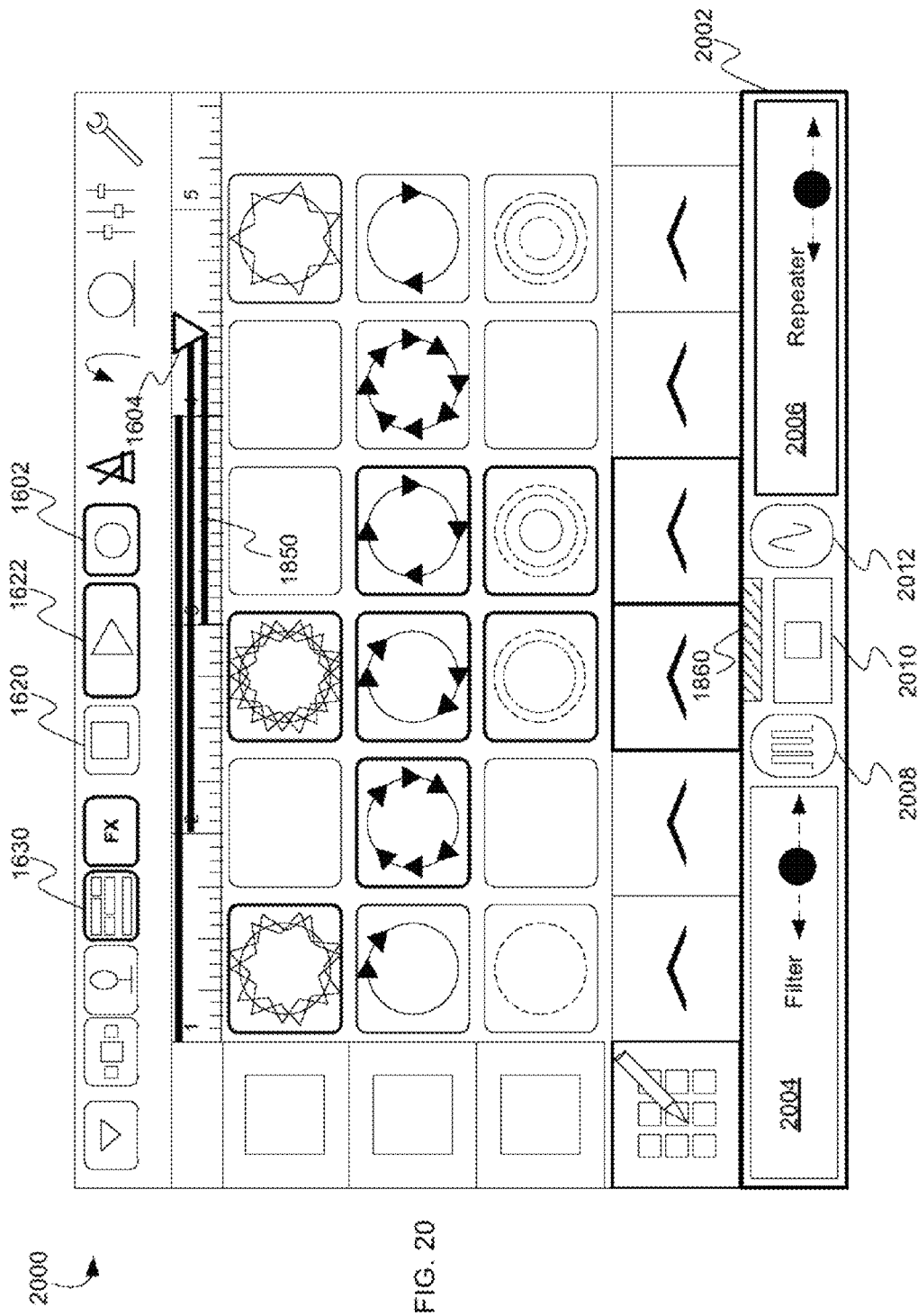
FIG. 20 illustrates an example graphical user interface presenting a minimized audio effects panel.

FIG. 20 illustrates an example graphical user interface 2000 presenting a minimized audio effects panel. In some implementations, a user can manipulate graphical element 1860 of FIG. 18 to minimize audio effects panel 1804. For example, the user can provide input to select and drag graphical element 1860 toward the bottom of GUI 1200 to minimize (e.g., transform) audio effects panel 1804 into audio effects panel 2002. For example, the user can minimize audio effects panel 1804 to view more of the music cells in the music cell grid presented on GUI 2000.

In some implementations, audio effects panel 2002 can include graphical elements 2004 and/or 2006 for manipulating audio effects. For example, when audio effects panel 1804 is minimized into audio effects panel 2002, music application 104 can minimize the two-dimensional control represented by graphical element 1810 into a one-dimensional control represented by graphical element 2004. If graphical element 1810 is associated with the filter audio effect when minimized, graphical element 2004 can also be associated with the filter audio effect.

As described above, graphical element 1810 allows the user to manipulate two attributes of an audio effect (e.g. the filter effect). However, since graphical element 2004 is a one-dimensional control, graphical element 2004 can allow manipulation of one of the two audio effect attributes (e.g., the X-axis attribute or the Y-axis attribute) of the audio effect associated with graphical element 1810. For example, graphical element 2004 can be configured to manipulate the most significant attribute of the filter audio effect (e.g., the cutoff attribute). For example, the user can provide touch input to graphical element 2004 to enable (e.g., activate) the corresponding audio effect and slide the user's finger (e.g., horizontally or vertically based on orientation) along graphical element 2004 to adjust the attribute of the corresponding audio effect. Music application 104 can minimize the two-dimensional control represented by graphical element 1820 into a one-dimensional control represented by graphical element 2006 in a similar manner as graphical element 1810.

In some implementations, audio effects panel 2002 can include graphical element 2008 for invoking a gating effect. For example, when audio effects panel 1804 is minimized into audio effects panel 2002, music application 104 can minimize graphical element 1830 corresponding to an audio gating effect into graphical element 2008. Instead of providing the one dimensional control of graphical element 1830 that allows the user to adjust an attribute of the gating effect, graphical element 2008 can provide an on/off toggle for the gating audio effect. The gating effect can be turned on when input is provided to graphical element 2008. The gating effect can be turned off when the user ceases to provide input to graphical element 2008.

In some implementations, audio effects panel 2002 can include graphical element 2012 for invoking a down sampling effect. For example, when audio effects panel 1804 is minimized into audio effects panel 2002, music application 104 can minimize graphical element 1832 corresponding to a down sampling effect into graphical element 2012. Instead of providing the one dimensional control of graphical element 1832 that allows the user to adjust an attribute of the down sampling effect, graphical element 2012 can provide an on/off toggle for the down sampling audio effect. The down sampling effect can be turned on when input is provided to graphical element 2012. The down sampling effect can be turned off when the user ceases to provide input to graphical element 2012.

In some implementations, audio effects panel 2002 can include graphical element 2010 for invoking a tape stop effect, a turntable scratch effect, or a reverse effect. For example, when audio effects panel 1804 is minimized into audio effects panel 2002, music application 104 can select one of graphical elements 1834, 1836, or 1838 corresponding to tape stop effect, turntable scratch effect, and reverse effect, respectively, to present as graphical element 2010 on audio effects panel 2002. For example, the user can select or configure one of tape stop effect, turntable scratch effect, and reverse effect for presentation on the minimized audio effects panel 2002.

Editing an Audio Effects Recording

Figure 21:
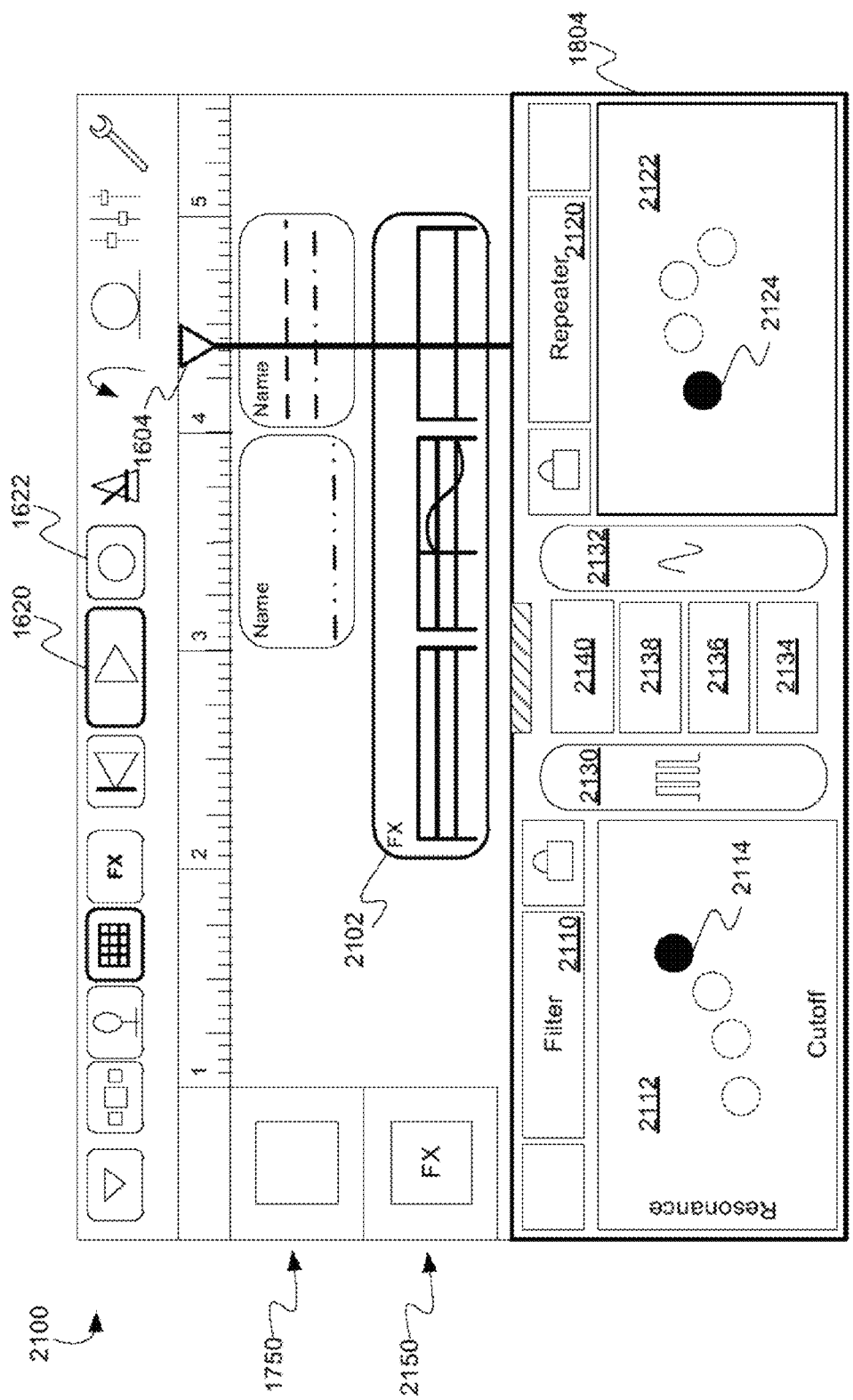
FIG. 21 illustrates an example graphical user interface presenting a detailed view of a performance recording including recorded audio effects.

FIG. 21 illustrates an example graphical user interface 2100 presenting a detailed view of a performance recording including recorded audio effects. As described above, the user can select graphical element 1622 to initiate a recording of a music cells selected by the user of computing device 102. The user can select and play music cells in a music cell grid as if playing a musical instrument. The user can select and manipulate audio effects while playing the music cells. The user's performance can be recorded and saved so that the user can later playback, view, and/or manipulate the recorded performance using GUI 2100. For example, after recording the performance, the user can select graphical element 1630 to present GUI 2100 presenting the detailed view of the performance recording. For example, GUI 2100 can correspond to GUI 1700 of FIG. 17. However, in the example of FIG. 21, GUI 2100 includes a representation 2102 of the recorded audio effects applied to the recording.

In some implementations, GUI 2100 can include graphical element 2102 representing recorded audio effects. For example, graphical element 2102 can be presented in detail view row 2150 corresponding to audio effects. Graphical element 2102 can include a graphical representation of the audio effects applied to the recorded playback of music cells. For example, graphical element 2102 can include graphs representing the user input applied to the two-dimensional controls of graphical elements 2112 and/or 2122. The graphs can include lines representing the X and Y axis values corresponding to the user's input to graphical elements 2112 and/or 2122. In some implementations, graphical element 2102 can include graphs representing the user input applied to one-dimensional controls 2130 and/or 2132.

In some implementations, GUI 2100 can present audio effects panel 1804 while playing back a performance recording that includes audio effects. For example, the user can select graphical element 1620 to playback a performance recording. When music application 104 plays back a portion of the performance recording that includes audio effects, the input that generated the audio effects can be represented on audio effects panel 1804.

For example, if the audio effect being played back corresponds to the filter effect identified by graphical element 2110 and associated with graphical element 2112, a user input animation 2114 indicating the locations within graphical element 2112 corresponding to the user input that generated the playing audio effect can be presented on graphical element 2112. Similarly, if the audio effect being played back corresponds to the repeater effect identified by graphical element 2120 and associated with graphical element 2122, a user input animation 2124 indicating the locations within graphical element 2122 corresponding to the user input that generated the playing audio effect can be presented on graphical element 2122. Likewise, graphical elements 2134, 2136 and/or 2138 can be animated, highlighted, or otherwise modified at appropriate times to indicate that the corresponding tape stop effect, turntable scratch effect, and/or reverse effect is being played back or activated in the performance recording.

In some implementations, audio effects can be recorded separately from music cell recordings. For example, the audio effects recording represented by graphical element 2102 can record audio effects attribute values or settings separately from the audio signals generated by the playback of music cells. Thus, the user can manipulate the audio effects recording to apply the recorded audio effects to different portions of the performance recording. For example, the user can provide input to graphical element 2102 to trim or otherwise modify the audio effects recording represented by graphical element 2102. The user can copy, paste, and/or move graphical element 2102 to other positions in the performance recording timeline so that the recorded audio effects can be applied to the playback of music cells recorded at different positions within the performance recording.

Example Processes

Figure 22:
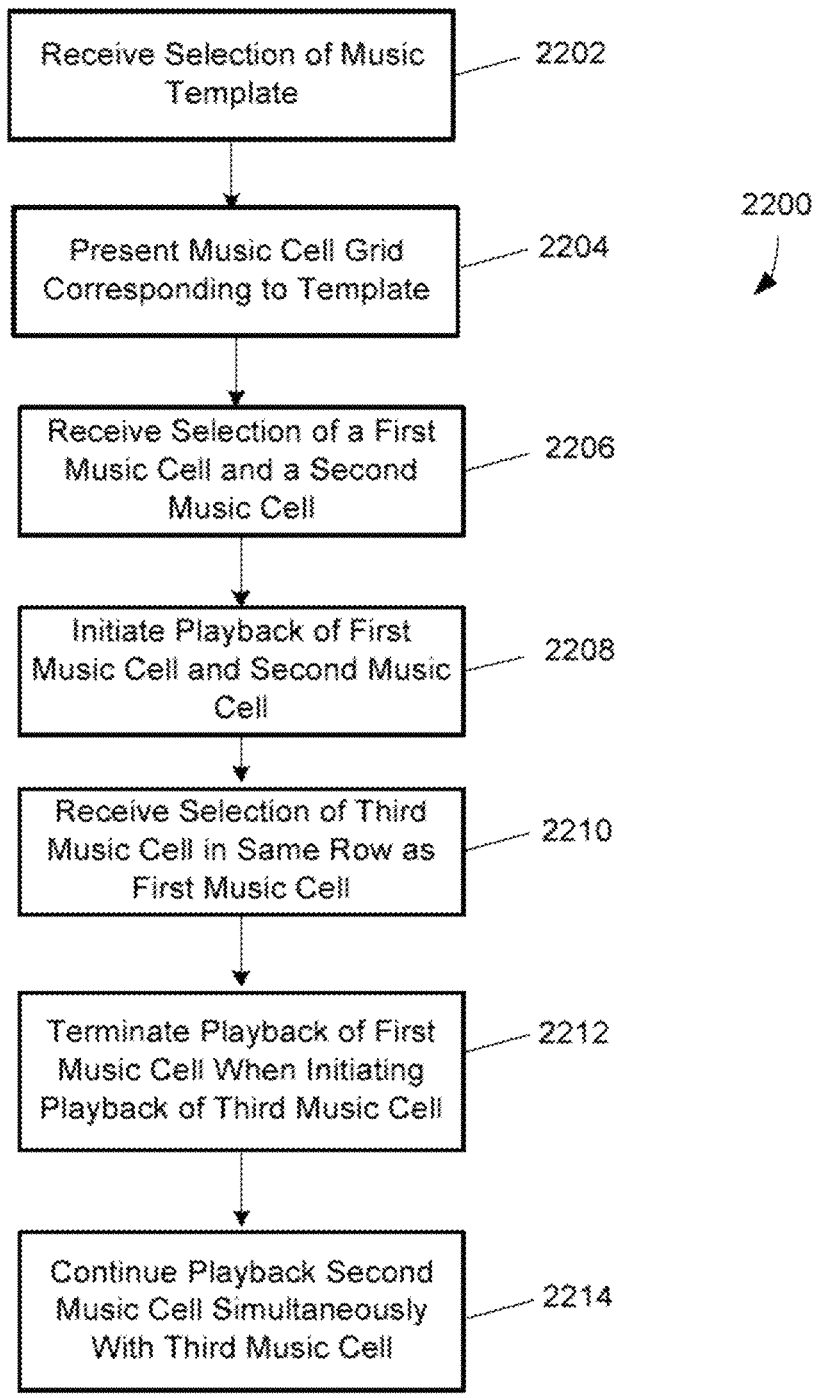
FIG. 22 is flow diagram of an example process for dynamic music authoring using a music cell grid.

FIG. 22 is a flow diagram of an example process 2200 for dynamic music authoring using a music cell grid. For example, music application 104 on computing device 102 can be configured to present a graphical user interface having a grid of music cells that the user can interact with to dynamically author music and create a music performance recording.

At step 2202, computing device 102 can receive a selection of a music template. For example, music application 104 on computing device 102 can present GUI 200 of FIG. 2 on display 103. The user can navigate through various music genre templates and select a music template based on the genre or style of music the user wishes to create.

At step 2204, computing device 102 can present a music cell grid corresponding to the selected template. For example, music application 104 can present GUI 300 of FIG. 3 on display 103 of computing device 102. The music grid can include music cells that each encapsulate one or more music segments (e.g., music samples) and options or parameters defining how to playback the music segments.

At step 2206, computing device 102 can receive a selection of a first music cell and a second music cell. For example, music application 104 can receive user input (e.g., touch input) selecting one or more music cells in the music cell grid, as described above with reference to FIG. 3 and FIG. 4. The input can include selection of individual music cells. The input can include selection of a group of music cells.

At step 2208, computing device 102 can initiate playback of the first music cell and the second music cell. For example, music application 104 can playback the music segments of the first and second music cells according to the settings of each cell. In some implementations, the first music cell and the second music cell can have different configurations. For example, the music cells can have different lengths. The music cells can play in different directions (e.g., forward, backward, etc.). The music cells can play at different speeds.

At step 2210, computing device 102 can receive a selection of a third music cell in the same row as the first music cell. For example, music application 104 can receive user input selecting another music cell in the same row (e.g., corresponding to the same instrument) as the first music cell.

At step 2212, computing device 102 can terminate the playback of the first music cell when initiating playback of the third music cell. For example, music application 104 can determine that the first music cell and the third music cell are in the same row in the grid of music cells. Based on this determination, music application 104 can terminate the playback of the first music cell when initiating playback of the third music cell. In some implementations, music application 104 can delay initiating the playback of the third music cell based on time snap boundaries configured for music application 104.

At step 2214, computing device 102 can continue the playback of the second music cell simultaneously with the playback of the third music cell. For example, since playback of the second music cell has not been terminated by the user, the second music cell can continue playing when playback is initiated for the third music cell.

Figure 23:
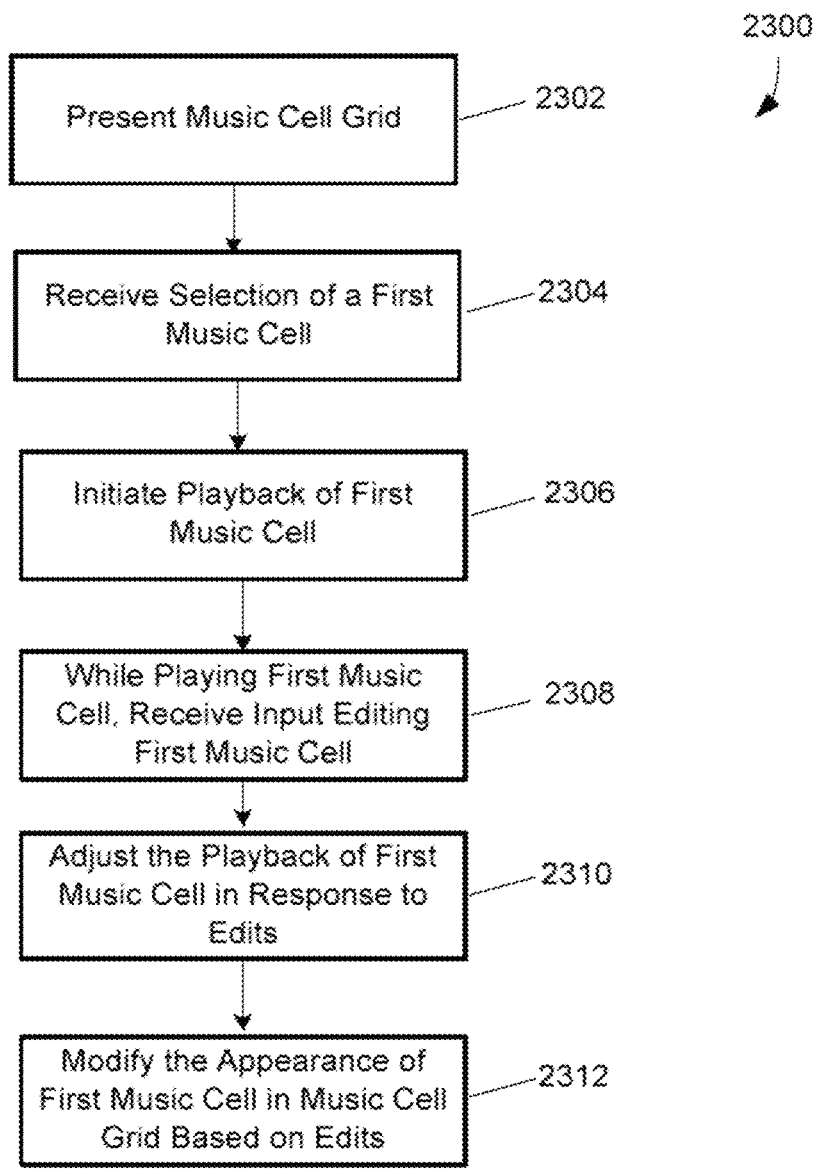
FIG. 23 is a flow diagram of an example process for editing a music cell.

FIG. 23 is a flow diagram of an example process 2300 for editing a music cell. In some implementations, a user can edit a music cell while the music cell is playing. For example, music application 104 can receive the user input editing the music cell and dynamically adjust the playback of the music cell based on the user's edits so that the user can observe the changes to the playback of the music cell in real time or near real time.

At step 2302, computing device 102 can present a music cell grid. For example, music application 104 on computing device 102 can present a music cell grid on display 103 of computing device 102. Music application 104 can present the music cell grid discussed with reference to FIG. 3, for example.

At step 2304, computing device 102 can receive a selection of a first music cell. For example, music application 104 can receive user input selecting a music cell presented in the music grid of GUI 300 of FIG. 3.

At step 2306, computing device 102 can initiate playback of the first music cell. For example, in response to receiving the user input selecting the first music cell, music application 104 can start playing the music segment of the first music cell according to the options and/or parameters of the first music cell. Music application 104 can begin playing the first music cell in response to receiving the selection of the first music cell. Music application 104 can delay initiating the playback of the first music cell to synchronize the playback of the first music cell with other playing music cells according to the time snap features described herein.

At step 2308, computing device 102 can receive input for editing the first music cell while playing the first music cell. For example, while playing the first music cell (and any other music cells), music application 104 can receive user input adjusting one or more settings of the first music cell, as described with reference to FIGS. 8, 9 and/or 10.

At step 2310, computing device 102 can adjust the playback of the first music cell in response to receiving the edits to the first music cell. For example, music application 104 can automatically and dynamically adjust the ongoing playback of the first music cell based on the edits and/or adjustments made to the music cell settings and/or corresponding music segment.

At step 2312, computing device 102 can modify the appearance of the first music cell in the music cell grid based on the edits to the first music cell. For example, music application 104 can automatically and dynamically adjust the graphical representation of the first music cell in the music cell grid according to the edits made to the first music cell and/or corresponding music segment. For example, music application 104 can adjust the graphical representation of the music segment waveform presented on the first music cell according to the change in length of the first music cell or according to the edits made to the corresponding music segment. If the first music cell settings change the music cell from a looped music cell to a single play music cell, then music application 104 can change the graphical representation of the music segment waveform presented on the first music cell from a looped (e.g., circular) representation to a linear representation.

Figure 24:
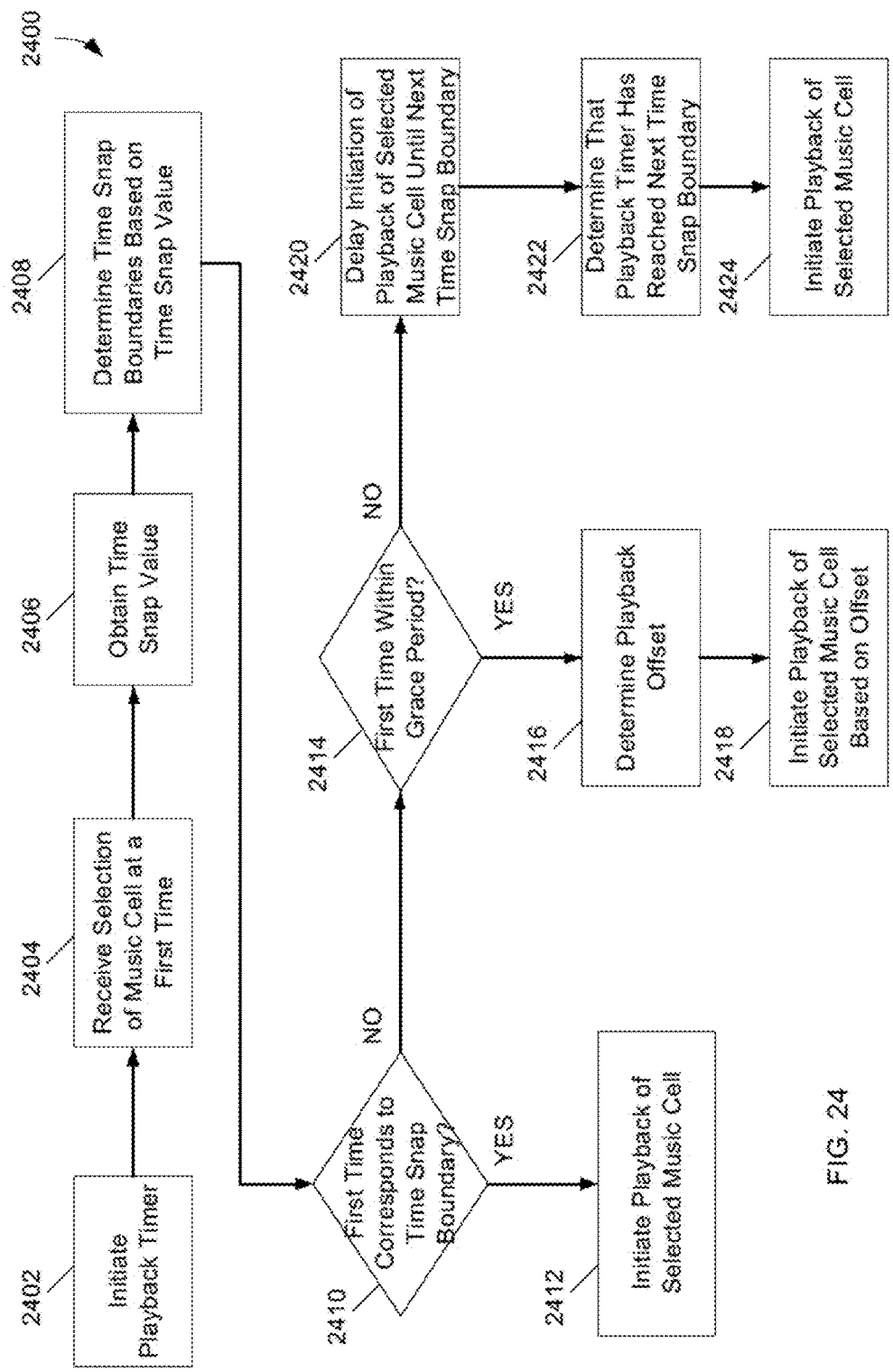
FIG. 24 is a flow diagram of an example process for synchronizing the playback of music cells.

FIG. 24 is a flow diagram of an example process 2400 for synchronizing the playback of music cells. For example, music application 104 on computing device 102 can synchronize the playback of music cells according to time snap boundaries configured in music application 104.

At step 2402, computing device 102 can initiate a playback timer. For example, music application 104 can initiate the playback timer when music application 104 receives user input to start recording a music performance. Music application 104 can initiate the playback timer when music application 104 receives user input selecting a music cell to playback. For example, time snap boundaries can be determined based on time elapsed since the initiation of the playback timer.

At step 2404, computing device 102 can receive a selection of a music cell at a first time. For example, music application 104 can receive a user selection of a music cell from the music cell grid of FIG. 3 or FIG. 16. The first time can correspond to the elapsed time since the playback timer was initiated. For example, the first time can correspond to the current time value of the playback timer.

At step 2406, computing device 102 can obtain a time snap value. For example, music application 104 can store a time snap value configured for music application 104 or configured for one or more of the music cells in the music grid. The time snap value can be a musical time period, such as a number of bars, a number of beats, or a number of minutes, for example.

At step 2408, computing device 102 can determine time snap boundaries based on the time snap value. For example, if the time snap value is 1 bar, then music application 104 can determine that time snap boundaries occur at time multiples of 1 bar (e.g., 1 bar, 2 bar, 10 bar, etc.).

At step 2410, computing device 102 can determine whether the first time corresponds to a time snap boundary. For example, music application 104 can determine whether the first time corresponds to a multiple of the time snap value. If the first time is 2 bar and the time snap value is 1 bar, then music application 104 can determine that the music cell was selected at a time snap boundary and can initiate playback of the selected music cell at step 2414. If the first time is not a multiple of the time snap value, then music application 104 can determine that the music cell was not selected at a time snap boundary.

At step 2414, computing device 102 can determine whether the first time falls within the smart pickup grace period. For example, the grace period can be a portion (e.g., $\frac{1}{8}^{th}$) of the time snap value. If the time snap value is 1 bar, the smart pickup grace period is $\frac{1}{8}^{th}$ of a bar. If the first time is 2.1 bar, the music cell was selected $\frac{1}{10}^{th}$ of a bar after the time snap boundary of 2 bar and is, therefore, within the smart pickup grace period. When the first time is within the smart pickup grace period, process 2400 can continue at step 2416. If the first time is 2.4 bar, the music cell was selected $\frac{2}{5}^{th}$ bar after the time snap boundary of 2 bar and is, therefore, not within the smart pickup grace period. When the first time is not within the smart pickup grace period, process 2400 can continue at step 2420.

At step 2416, computing device 102 can determine the playback offset for the selected music cell. Continuing the example above, since the selected music cell was selected $\frac{1}{10}^{th}$ bar after the time snap boundary (e.g., 2 bar), music application 104 can determine that the playback offset for the music cell is $\frac{1}{10}^{th}$ bar.

At step 2418, computing device 102 can initiate playback of the selected music cell using the determined offset. For example, music application 104 can (e.g., immediately or near immediately) start playback of the selected music cell at $\frac{1}{10}^{th}$ bar from the beginning of the music cell and/or corresponding music segment so that the music cell is synchronized with the playback timer (and other playing music cells).

At step 2420, computing device 102 can delay initiation of playback of the selected music cell until the next time snap boundary. For example, when the first time does not fall within the smart pickup grace period, music application 104 can wait to initiate playback of the selected music cell until the next time snap boundary. Continuing the example above, if the time snap value is 1 bar and the first time is 2.4 bar, then music application can wait to initiate playback of the selected music cell until the playback timer reaches 3 bar.

At step 2422, computing device 102 can determine that the playback timer has reached the next time snap boundary. For example, music application 104 can determine that the playback timer has reached 3 bar.

At step 2424, computing device 102 can initiate playback of the selected music cell. For example, in response to determining that the playback timer has reached 3 bar, music application 104 can initiate playback of the selected music cell.

Figure 25:
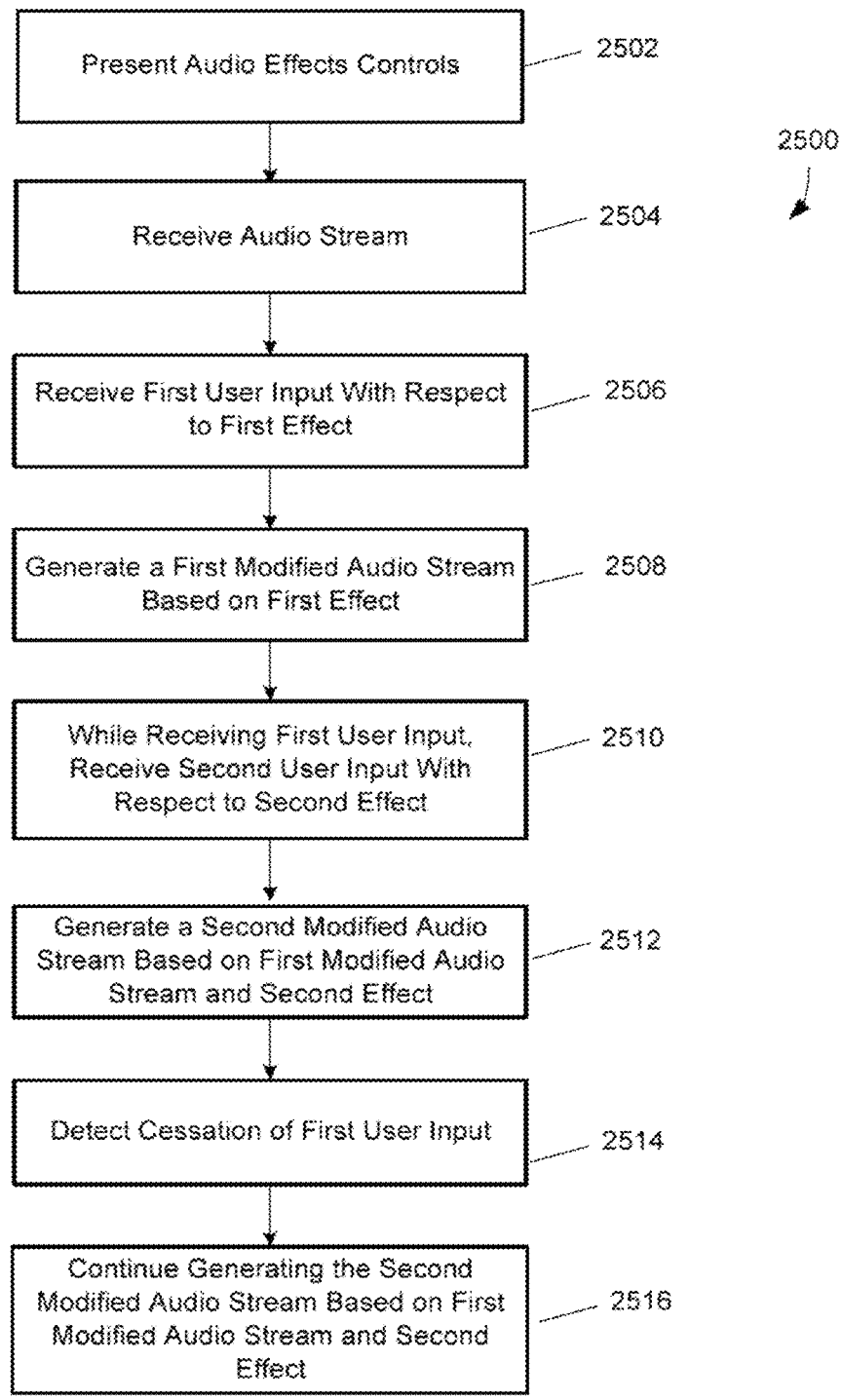
FIG. 25 is a flow diagram of an example process for layering audio effects.

FIG. 25 is a flow diagram of an example process 2500 for layering audio effects. For example, music application 104 on computing device 102 can present user interface controls for applying a variety of audio effects to an audio stream generated or obtained by computing device 102. For example, the user can interact with the audio effects controls to modify an audio stream (e.g., audio signal) generated by one or more music cells in the music grid described above. The audio effects can be layered or sequenced according to when the user input to the audio effects controls is received. The audio effects can be locked on such that the audio effects can continue even after the user input stops.

At step 2502, computing device 102 can present audio effects controls on display 103 of computing device 102. For example, music application 104 can present GUI 1800 of FIG. 18.

At step 2504, computing device 102 can receive an audio stream. For example, music application 104 can generate an audio stream or audio signal based on user-selected music cells presented in the music cell grid of GUI 1800.

At step 2506, computing device 102 can receive a first user input with respect to a first effect. For example, music application 104 can present a first two-dimensional control on GUI 1800 for adjusting a repeater effect. The repeater effect can, for example, be configured to repeat a previously played portion of the audio stream or audio signal. The user can provide input (e.g., touch input) to the first two-dimensional control to apply the repeater effect to the audio stream and adjust the parameters of the repeater effect.

At step 2508, computing device 102 can generate a first modified audio stream based on the first effect. For example, music application 104 can repeat a previously played portion of the audio stream or audio signal according to the user input provided to the first two dimensional audio effects control to generate the first modified audio stream.

At step 2510, computing device 102 can receive a second user input with respect to a second audio effect while receiving the first user input. For example, music application 104 can present a second two-dimensional control on GUI 1800 for adjusting a filter effect. The filter effect can, for example, be configured to apply one or more filters (e.g., a frequency cutoff filter) to the repeating portion of the audio stream or audio signal. The user can provide input (e.g., touch input) to the second two-dimensional control to apply the filter effect to the repeating portion of the audio stream and adjust the parameters of the filter effect.

At step 2512, computing device 102 can generate a second modified audio stream based on the first modified audio stream and the second audio effect. For example, music application 104 can generate the second modified audio stream by filtering the repeating portion of the audio stream according to the user input provided to the second two-dimensional control.

At step 2514, computing device 102 can detect cessation of the first user input. For example, music application 104 can detect when the user stops providing input to the first two-dimensional audio effects control.

At step 2516, computing device 102 can continue generating the second modified audio stream based on the first modified audio stream and the second user input. For example, even though the user stopped providing input to the first two-dimensional control, music application 104 can continue to apply the repeater effect to the music stream while the user continues to provide input to the second two-dimensional control. For example, while the user continues to provide input to the second two-dimensional control, the first two-dimensional control can be locked or latched on and can modify the original audio stream according to the input provided by the user when the user stopped providing input to the first two-dimensional control.

Figure 26:
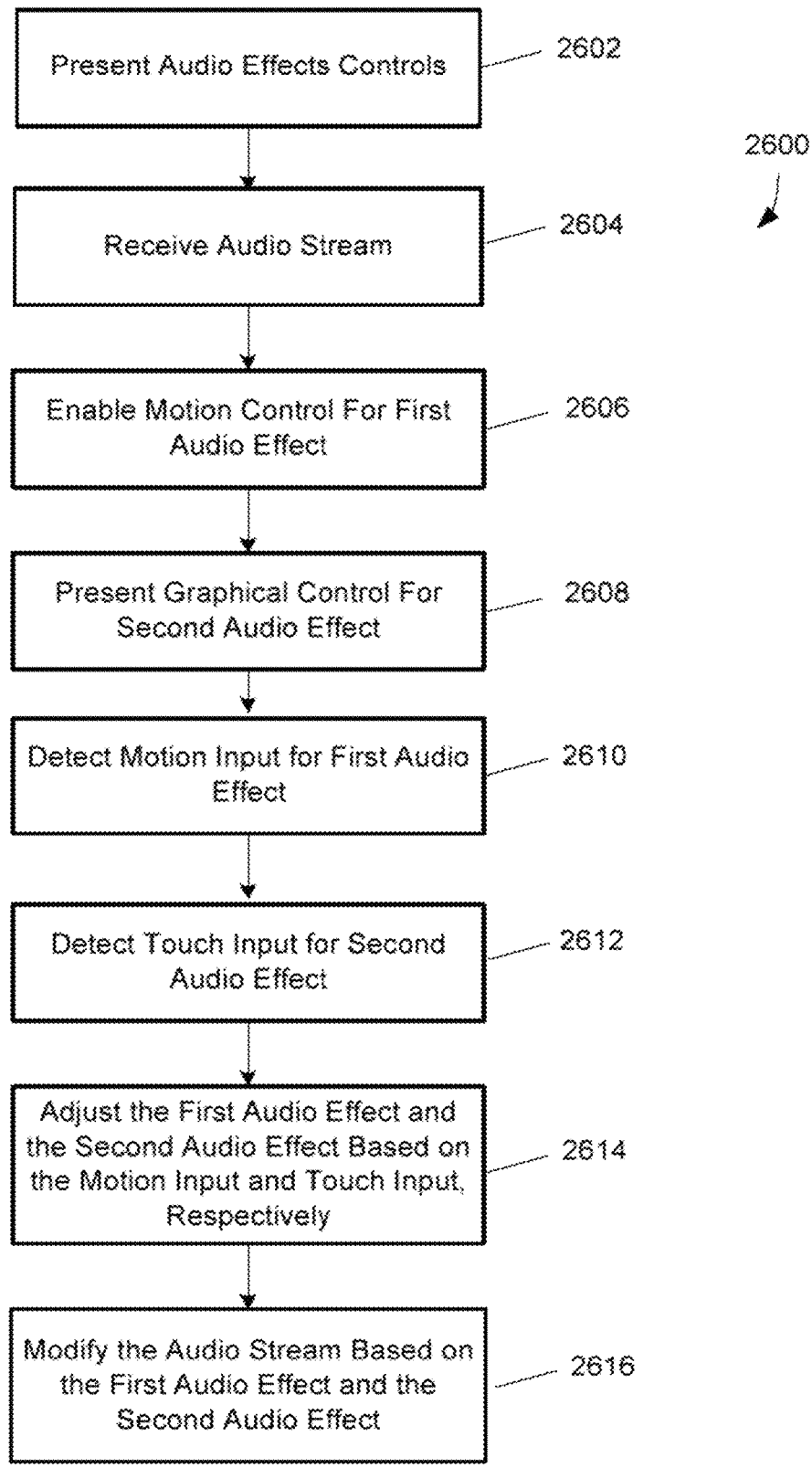
FIG. 26 is a flow diagram of an example process for adjusting audio effects using motion input controls.

FIG. 26 is a flow diagram of an example process 2600 for adjusting audio effects using motion input controls. For example, music application 104 can be configured to apply and/or adjust audio effects based on motion and/or touch input.

At step 2602, computing device 102 can present audio effects controls on display 103 of computing device 102. For example, music application 104 can present GUI 1800 of FIG. 18.

At step 2604, computing device 102 can receive an audio stream. For example, music application 104 can generate an audio stream or audio signal based on user-selected music cells presented in the music cell grid of GUI 1800.

At step 2606, computing device 102 can enable motion control for a first audio effect. For example, music application 104 can receive input enabling motion control for applying the filter audio effect to the audio stream. The filter audio effect can be associated with a two-dimensional control presented on GUI 1800. Alternatively, GUI 1800 can be presented without an audio effect control for the filter effect.

At step 2608, computing device 102 can present a graphical control for a second audio effect. For example, GUI 1800 can present a two-dimensional control for applying a repeater effect to the audio stream. For example, display 103 of computing device 102 may not be big enough to present two audio effects controls on GUI 1800. Thus, music application 104 can allow the user to control a first audio effect (e.g., the repeater) using the graphical control and a second audio effect (e.g., the filter) using motion control.

At step 2610, computing device 102 can detect motion input for a first audio effect. For example, when computing device 102 is a handheld device (e.g., a smartphone, tablet computer, etc.), computing device 102 may include motion sensor 108. The user can move (e.g., tilt, rotate, shake, etc.) computing device 102 to cause motion sensor 108 to generate motion data.

At step 2612, computing device 102 can detect touch input for the second audio effect. For example, the user can provide touch input to the graphical control for the second audio effect (e.g., the repeater) presented on GUI 1800.

At step 2614, computing device 102 can adjust the first audio effect and the second audio effect based on the motion input and the touch input. For example, music application 104 can convert the motion data into audio effect attribute values to adjust, for example, the filter effect based on the movement of computing device 102. Music application 104 can interpret the touch input to determine attribute values for the repeater effect, as described above.

At step 2616, computing device 102 can modify the audio stream based on the first audio effect and the second audio effect. For example, music application 104 can modify the sound of the audio stream based on the attribute values for the repeater effect and filter effect.

While the processes described herein describe certain steps of the processes in a certain order or arrangement, it should be understood that the steps of the processes can be performed in a different order than described or may be omitted and/or combined within the processes while still producing the same or similar results. Additionally, while separate processes are described for clarity and ease of understanding, it should be understood that these processes are part of a larger complex system and the processes and/or steps of the processes may be combined or rearranged to provide different features, interactions, and/or combinations of features. For example, while the music authoring features described herein may be described individually, it should be understood that the individual features may be combined to provide a complex, multifunctional music authoring system.

Example System Architecture

Figure 27:
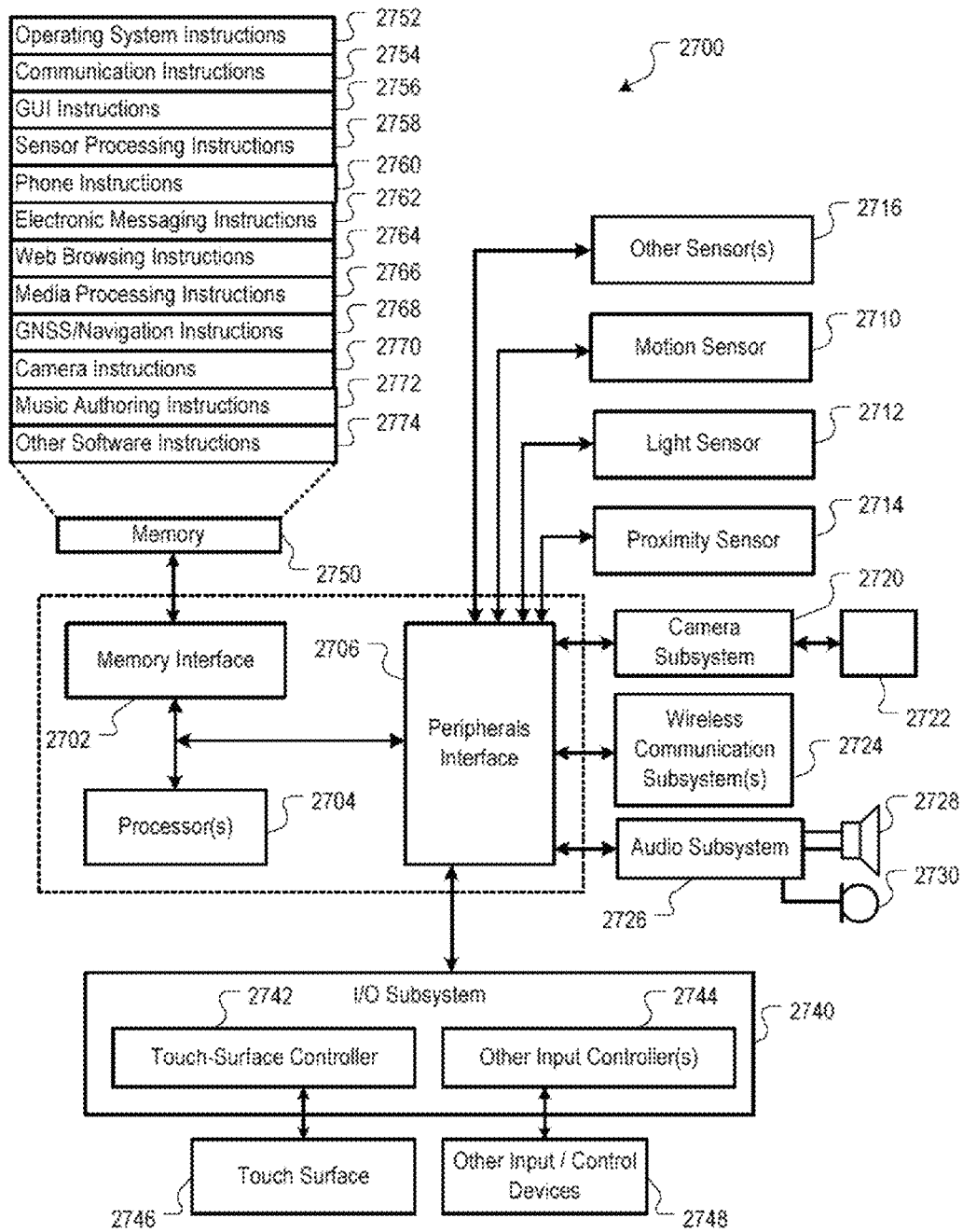
FIG. 27 is a block diagram of an example computing device that can implement the features and processes of FIGS. 1-26.

FIG. 27 is a block diagram of an example computing device 2700 that can implement the features and processes of FIGS. 1-26. The computing device 2700 can include a memory interface 2702, one or more data processors, image processors and/or central processing units 2704, and a peripherals interface 2706. The memory interface 2702, the one or more processors 2704 and/or the peripherals interface 2706 can be separate components or can be integrated in one or more integrated circuits. The various components in the computing device 2700 can be coupled by one or more communication buses or signal lines.

Sensors, devices, and subsystems can be coupled to the peripherals interface 2706 to facilitate multiple functionalities. For example, a motion sensor 2710, a light sensor 2712, and a proximity sensor 2714 can be coupled to the peripherals interface 2706 to facilitate orientation, lighting, and proximity functions. Other sensors 2716 can also be connected to the peripherals interface 2706, such as a global navigation satellite system (GNSS) (e.g., GPS receiver), a temperature sensor, a biometric sensor, magnetometer or other sensing device, to facilitate related functionalities.

A camera subsystem 2720 and an optical sensor 2722, e.g., a charged coupled device (CCD) or a complementary metal-oxide semiconductor (CMOS) optical sensor, can be utilized to facilitate camera functions, such as recording photographs and video clips. The camera subsystem 2720 and the optical sensor 2722 can be used to collect images of a user to be used during authentication of a user, e.g., by performing facial recognition analysis.

Communication functions can be facilitated through one or more wireless communication subsystems 2724, which can include radio frequency receivers and transmitters and/or optical (e.g., infrared) receivers and transmitters. The specific design and implementation of the communication subsystem 2724 can depend on the communication network(s) over which the computing device 2700 is intended to operate. For example, the computing device 2700 can include communication subsystems 2724 designed to operate over a GSM network, a GPRS network, an EDGE network, a Wi-Fi or WiMax network, and a Bluetooth™ network. In particular, the wireless communication subsystems 2724 can include hosting protocols such that the device 100 can be configured as a base station for other wireless devices.

An audio subsystem 2726 can be coupled to a speaker 2728 and a microphone 2730 to facilitate voice-enabled functions, such as speaker recognition, voice replication, digital recording, and telephony functions. The audio subsystem 2726 can be configured to facilitate processing voice commands, voiceprinting and voice authentication, for example.

The I/O subsystem 2740 can include a touch-surface controller 2742 and/or other input controller(s) 2744. The touch-surface controller 2742 can be coupled to a touch surface 2746. The touch surface 2746 and touch-surface controller 2742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 2746.

The other input controller(s) 2744 can be coupled to other input/control devices 2748, such as one or more buttons, rocker switches, thumb-wheel, infrared port, USB port, and/or a pointer device such as a stylus. The one or more buttons (not shown) can include an up/down button for volume control of the speaker 2728 and/or the microphone 2730.

In one implementation, a pressing of the button for a first duration can disengage a lock of the touch surface 2746; and a pressing of the button for a second duration that is longer than the first duration can turn power to the computing device 2700 on or off. Pressing the button for a third duration can activate a voice control, or voice command, module that enables the user to speak commands into the microphone 2730 to cause the device to execute the spoken command. The user can customize a functionality of one or more of the buttons. The touch surface 2746 can, for example, also be used to implement virtual or soft buttons and/or a keyboard.

In some implementations, the computing device 2700 can present recorded audio and/or video files, such as MP3, AAC, and MPEG files. In some implementations, the computing device 2700 can include the functionality of an MP3 player The computing device 2700 can, therefore, include a wired connector for connecting computing device 2700 to other devices. Other input/output and control devices can also be used.

The memory interface 2702 can be coupled to memory 2750. The memory 2750 can include high-speed random access memory and/or non-volatile memory, such as one or more magnetic disk storage devices, one or more optical storage devices, and/or flash memory (e.g., NAND, NOR). The memory 2750 can store an operating system 2752, such as Darwin, RTXC, LINUX, UNIX, OS X, WINDOWS, or an embedded operating system such as VxWorks.

The operating system 2752 can include instructions for handling basic system services and for performing hardware dependent tasks. In some implementations, the operating system 2752 can be a kernel (e.g., UNIX kernel). In some implementations, the operating system 2752 can include instructions for performing voice authentication. For example, operating system 2752 can implement the dynamic music authoring features as described with reference to FIGS. 1-26.

The memory 2750 can also store communication instructions 2754 to facilitate communicating with one or more additional devices, one or more computers and/or one or more servers. The memory 2750 can include graphical user interface instructions 2756 to facilitate graphic user interface processing; sensor processing instructions 2758 to facilitate sensor-related processing and functions; phone instructions 2760 to facilitate phone-related processes and functions; electronic messaging instructions 2762 to facilitate electronic-messaging related processes and functions; web browsing instructions 2764 to facilitate web browsing-related processes and functions; media processing instructions 2766 to facilitate media processing-related processes and functions; GNSS/Navigation instructions 2768 to facilitate GNSS and navigation-related processes and instructions; and/or camera instructions 2770 to facilitate camera-related processes and functions.

The memory 2750 can store other software instructions 2772 to facilitate other processes and functions, such as the dynamic music authoring processes and functions as described with reference to FIGS. 1-26.

The memory 2750 can also store other software instructions 2774, such as web video instructions to facilitate web video-related processes and functions; and/or web shopping instructions to facilitate web shopping-related processes and functions. In some implementations, the media processing instructions 2766 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 2750 can include additional instructions or fewer instructions. Furthermore, various functions of the computing device 2700 can be implemented in hardware and/or in software, including in one or more signal processing and/or application specific integrated circuits.

What is claimed is:

1. A method comprising:
   presenting, by a computing device, a grid of music cells on a display of the computing device, where each music cell is a container for at least one music segment and a plurality of music cell settings that define how to play the one or more music segments;

receiving, by the computing device, a first user input selecting a first music cell in a first row of the grid of music cells;

receiving, by the computing device, a second user input selecting a second music cell in a second row of the grid of music cells;

simultaneously playing, by the computing device, the first music cell and the second music cell;

receiving, by the computing device, a third user input selecting a third music cell in the first row of the grid of music cells;

in response to receiving the selection of the third music cell, terminating, by the computing device, playback of the first music cell when initiating playback of the third music cell; and continuing to play, by the computing device, the second music cell simultaneously with the third music cell.

2. The method of claim 1, further comprising:
determining, by the computing device, that the third user input was received at a time corresponding to a time snap boundary; and
initiating, by the computing device, playback of the third music cell when the third input is received.

3. The method of claim 1, further comprising:
determining, by the computing device, that the third user input was received at a time between a first time snap boundary and a second time snap boundary; and
delaying, by the computing device, playback of the third music cell until the second time snap boundary.

4. The method of claim 1, further comprising:
while playing the third music cell, receiving, by the computing device, a fourth user input causing a modification to the third music cell; and
in response to receiving the fourth user input and while playing the third music cell, dynamically adjusting, by the computing device, playback of the third music cell according to the modification made to the third music cell.

5. The method of claim 4, wherein the modification includes trimming the music segment of the third music cell.

6. The method of claim 4, wherein the modification includes adjusting the length of the third music cell.

7. The method of claim 4, wherein the modification includes changing the third music cell from a looped music cell to a single play music cell.

8. A non-transitory computer-readable medium including one or more sequences of instructions that, when executed by one or more processors, causes:
presenting, by a computing device, a grid of music cells on a display of the computing device, where each music cell is a container for at least one music segment and a plurality of music cell settings that define how to play the one or more music segments;
receiving, by the computing device, a first user input selecting a first music cell in a first row of the grid of music cells;
receiving, by the computing device, a second user input selecting a second music cell in a second row of the grid of music cells;
simultaneously playing, by the computing device, the first music cell and the second music cell;
receiving, by the computing device, a third user input selecting a third music cell in the first row of the grid of music cells;

in response to receiving the selection of the third music cell, terminating, by the computing device, playback of the first music cell when initiating playback of the third music cell; and continuing to play, by the computing device, the second music cell simultaneously with the third music cell.

9. The non-transitory computer-readable medium of claim 8, wherein the instructions cause:
determining, by the computing device, that the third user input was received at a time corresponding to a time snap boundary; and
initiating, by the computing device, playback of the third music cell when the third input is received.

10. The non-transitory computer-readable medium of claim 8, wherein the instructions cause:
determining, by the computing device, that the third user input was received at a time between a first time snap boundary and a second time snap boundary; and
delaying, by the computing device, playback of the third music cell until the second time snap boundary.

11. The non-transitory computer-readable medium of claim 8, wherein the instructions cause:
while playing the third music cell, receiving, by the computing device, a fourth user input causing a modification to the third music cell; and
in response to receiving the fourth user input and while playing the third music cell, dynamically adjusting, by the computing device, playback of the third music cell according to the modification made to the third music cell.

12. The non-transitory computer-readable medium of claim 11, wherein the modification includes trimming the music segment of the third music cell.

13. The non-transitory computer-readable medium of claim 11, wherein the modification includes adjusting the length of the third music cell.

14. The non-transitory computer-readable medium of claim 11, wherein the modification includes changing the third music cell from a looped music cell to a single play music cell.

15. A system comprising:
one or more processors;
a display device; and
a computer-readable medium including one or more sequences of instructions that, when executed by the one or more processors, causes:
presenting, by a system, a grid of music cells on the display device of the system, where each music cell is a container for at least one music segment and a plurality of music cell settings that define how to play the one or more music segments;
receiving, by the system, a first user input selecting a first music cell in a first row of the grid of music cells;
receiving, by the system, a second user input selecting a second music cell in a second row of the grid of music cells;
simultaneously playing, by the system, the first music cell and the second music cell;
receiving, by the system, a third user input selecting a third music cell in the first row of the grid of music cells;
in response to receiving the selection of the third music cell, terminating, by the system, playback of the first music cell when initiating playback of the third music cell; and continuing to play, by the system, the second music cell simultaneously with the third music cell.

16. The system of claim 15, wherein the instructions cause:
    determining, by the system, that the third user input was received at a time corresponding to a time snap boundary; and
    initiating, by the system, playback of the third music cell when the third input is received.

17. The system of claim 15, wherein the instructions cause:
    determining, by the system, that the third user input was received at a time between a first time snap boundary and a second time snap boundary; and
    delaying, by the system, playback of the third music cell until the second time snap boundary.

18. The system of claim 15, wherein the instructions cause:
    while playing the third music cell, receiving, by the system, a fourth user input causing a modification to the third music cell; and
    in response to receiving the fourth user input and while playing the third music cell, dynamically adjusting, by the system, playback of the third music cell according to the modification made to the third music cell.

19. The system of claim 18, wherein the modification includes trimming the music segment of the third music cell.

20. The system of claim 18, wherein the modification includes adjusting the length of the third music cell.

21. The system of claim 18, wherein the modification includes changing the third music cell from a looped music cell to a single play music cell.

* * * * *